United States Patent
Krishnamurthy et al.

(10) Patent No.: US 11,113,095 B2
(45) Date of Patent: Sep. 7, 2021

(54) ROBOTIC PROCESS AUTOMATION SYSTEM WITH SEPARATE PLATFORM, BOT AND COMMAND CLASS LOADERS

(71) Applicant: Automation Anywhere, Inc., San Jose, CA (US)

(72) Inventors: Sudharshan Krishnamurthy, San Jose, CA (US); James Dennis, San Jose, CA (US); Virinchipuram J Anand, San Ramon, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 0 days.

(21) Appl. No.: 16/731,044

(22) Filed: Dec. 31, 2019

(65) Prior Publication Data

US 2020/0348960 A1    Nov. 5, 2020

Related U.S. Application Data

(63) Continuation-in-part of application No. 16/398,532, filed on Apr. 30, 2019, and a continuation-in-part of application No. 16/398,600, filed on Apr. 30, 2019.

(51) Int. Cl.
*G06F 9/455* (2018.01)
*G06F 9/445* (2018.01)

(52) U.S. Cl.
CPC ...... *G06F 9/45558* (2013.01); *G06F 9/44521* (2013.01); *G06F 9/45529* (2013.01);
(Continued)

(58) Field of Classification Search
CPC .............. G06F 9/45558; G06F 9/5077; G06F 2009/45591; G06F 9/45533; G06F 9/541;
(Continued)

(56) References Cited

U.S. PATENT DOCUMENTS 5,949,999 A    9/1999  Song et al.
5,983,001 A    11/1999 Boughner et al.
(Continued)

FOREIGN PATENT DOCUMENTS

WO    2016163901 A1    10/2016

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).
(Continued)

*Primary Examiner* — Tuan C Dao

(57) ABSTRACT

A robotic process automation system includes a server processor that performs an automation task to process a work item, by initiating a java virtual machine on a second device. A first user session that employs credentials of a first user for managing execution of the automation task is also initiated on the second device. The server processor loads into the java virtual machine, with a platform class loader, one or more modules, such as logging and security, that perform functions common to the sets of task processing instructions. A first class loader a first set of task processing instructions is also loaded. Then each instruction in the first set of task processing instructions is loaded with a separate class loader. The server processor causes execution, under control of the first user session, on the second device, the task processing instructions that correspond to the work item.

20 Claims, 15 Drawing Sheets

(52) U.S. Cl.
CPC .............. *G05B 2219/40392* (2013.01); *G06F 2009/4557* (2013.01)

(58) Field of Classification Search
CPC ........... G06F 2009/45579; G06F 9/485; G06F 9/5027; G06F 9/542; G06F 2009/45575; G06F 9/44521; G06F 11/3414
See application file for complete search history.

(56) References Cited

U.S. PATENT DOCUMENTS

| | | | |
|---|---|---|---|
| 6,133,917 | A | 10/2000 | Feigner et al. |
| 6,389,592 | B1 | 5/2002 | Ayres et al. |
| 6,427,234 | B1 | 7/2002 | Chambers et al. |
| 6,473,794 | B1 | 10/2002 | Guheen et al. |
| 6,496,979 | B1 | 12/2002 | Chen et al. |
| 6,640,244 | B1 | 10/2003 | Bowman-Amuah |
| 6,704,873 | B1 | 3/2004 | Underwood |
| 6,898,764 | B2 | 5/2005 | Kemp |
| 6,931,544 | B1 | 8/2005 | Kienhöfer et al. |
| 6,954,747 | B1 | 10/2005 | Wang et al. |
| 7,091,898 | B2 | 8/2006 | Arling et al. |
| 7,246,128 | B2 | 7/2007 | Jordahl |
| 7,398,469 | B2 | 7/2008 | Kisamore et al. |
| 7,441,007 | B1 | 10/2008 | Kirkpatrick et al. |
| 7,533,096 | B2 | 5/2009 | Rice et al. |
| 7,568,109 | B2 | 7/2009 | Powell et al. |
| 7,571,427 | B2 | 8/2009 | Wang et al. |
| 7,765,525 | B1 | 7/2010 | Davidson et al. |
| 7,805,317 | B2 | 9/2010 | Khan et al. |
| 7,805,710 | B2 | 9/2010 | North |
| 7,810,070 | B2 | 10/2010 | Nasuti et al. |
| 7,846,023 | B2 | 12/2010 | Evans et al. |
| 8,028,269 | B2 | 9/2011 | Bhatia et al. |
| 8,056,092 | B2 | 11/2011 | Allen et al. |
| 8,095,910 | B2 | 1/2012 | Nathan et al. |
| 8,132,156 | B2 | 3/2012 | Malcolm |
| 8,209,738 | B2 | 6/2012 | Nicol et al. |
| 8,234,622 | B2 | 7/2012 | Meijer et al. |
| 8,245,215 | B2 | 8/2012 | Extra |
| 8,352,464 | B2 | 1/2013 | Fotev |
| 8,396,890 | B2 | 3/2013 | Lim |
| 8,438,558 | B1 | 5/2013 | Adams |
| 8,443,291 | B2 | 5/2013 | Ku et al. |
| 8,464,240 | B2 | 6/2013 | Fritsch et al. |
| 8,498,473 | B2 | 7/2013 | Chong et al. |
| 8,504,803 | B2 | 8/2013 | Shukla |
| 8,631,458 | B1 | 1/2014 | Banerjee |
| 8,682,083 | B2 | 3/2014 | Kumar et al. |
| 8,713,003 | B2 | 4/2014 | Fotev |
| 8,769,482 | B2 | 7/2014 | Batey et al. |
| 8,819,241 | B1 | 8/2014 | Washburn |
| 8,832,048 | B2 | 9/2014 | Lim |
| 8,874,685 | B1 | 10/2014 | Hollis et al. |
| 8,943,493 | B2 | 1/2015 | Schneider |
| 8,965,905 | B2 | 2/2015 | Ashmore et al. |
| 9,104,294 | B2 | 8/2015 | Forstall et al. |
| 9,213,625 | B1 | 12/2015 | Schrage |
| 9,278,284 | B2 | 3/2016 | Ruppert et al. |
| 9,444,844 | B2 | 9/2016 | Edery et al. |
| 9,462,042 | B2 | 10/2016 | Shukla et al. |
| 9,571,332 | B2 | 2/2017 | Subramaniam et al. |
| 9,621,584 | B1 | 4/2017 | Schmidt et al. |
| 9,946,233 | B2 | 4/2018 | Brun et al. |
| 2002/0057678 | A1* | 5/2002 | Jiang ........................ H04L 67/26 370/353 |
| 2003/0033590 | A1 | 2/2003 | Leherbauer |
| 2003/0088604 | A1 | 5/2003 | Kuck et al. |
| 2003/0101245 | A1 | 5/2003 | Srinivasan et al. |
| 2003/0159089 | A1 | 8/2003 | DiJoseph |
| 2004/0083472 | A1 | 4/2004 | Rao et al. |
| 2004/0172526 | A1 | 9/2004 | Tann et al. |
| 2004/0210885 | A1 | 10/2004 | Wang et al. |
| 2004/0243994 | A1 | 12/2004 | Nasu |
| 2005/0021713 | A1 | 1/2005 | Dugan et al. |
| 2005/0188357 | A1 | 8/2005 | Derks et al. |
| 2005/0204343 | A1 | 9/2005 | Kisamore et al. |
| 2005/0257214 | A1 | 11/2005 | Moshir et al. |
| 2006/0095276 | A1 | 5/2006 | Axelrod et al. |
| 2006/0150188 | A1 | 7/2006 | Roman et al. |
| 2007/0101291 | A1 | 5/2007 | Forstall et al. |
| 2007/0112574 | A1 | 5/2007 | Greene |
| 2007/0169025 | A1 | 7/2007 | Moore et al. |
| 2007/0169110 | A1 | 7/2007 | Gupta et al. |
| 2007/0261124 | A1* | 11/2007 | Centonze ............ G06F 21/6227 726/27 |
| 2008/0005086 | A1 | 1/2008 | Moore |
| 2008/0028392 | A1 | 1/2008 | Chen et al. |
| 2008/0209392 | A1 | 8/2008 | Able et al. |
| 2008/0222454 | A1 | 9/2008 | Kelso |
| 2008/0263624 | A1 | 10/2008 | Landschaft et al. |
| 2009/0037509 | A1 | 2/2009 | Parekh et al. |
| 2009/0103769 | A1 | 4/2009 | Milov et al. |
| 2009/0172814 | A1 | 7/2009 | Khosravi et al. |
| 2009/0199160 | A1 | 8/2009 | Vaitheeswaran et al. |
| 2009/0217309 | A1 | 8/2009 | Grechanik et al. |
| 2009/0222798 | A1 | 9/2009 | Iguchi et al. |
| 2009/0249297 | A1 | 10/2009 | Doshi et al. |
| 2009/0313229 | A1 | 12/2009 | Fellenstein et al. |
| 2009/0320002 | A1 | 12/2009 | Peri-Glass et al. |
| 2010/0023602 | A1 | 1/2010 | Martone |
| 2010/0023933 | A1 | 1/2010 | Bryant et al. |
| 2010/0100605 | A1 | 4/2010 | Allen et al. |
| 2010/0138015 | A1 | 6/2010 | Colombo et al. |
| 2010/0235433 | A1 | 9/2010 | Ansari et al. |
| 2011/0022578 | A1 | 1/2011 | Fotev |
| 2011/0145807 | A1 | 6/2011 | Molinie et al. |
| 2011/0173239 | A1 | 7/2011 | Sayed et al. |
| 2011/0197121 | A1 | 8/2011 | Kletter |
| 2011/0276568 | A1 | 11/2011 | Fotev |
| 2011/0276946 | A1 | 11/2011 | Pletter |
| 2011/0302570 | A1 | 12/2011 | Kurimilla et al. |
| 2012/0042281 | A1 | 2/2012 | Green |
| 2012/0124062 | A1 | 5/2012 | Macbeth et al. |
| 2012/0265976 | A1* | 10/2012 | Spiers ................. G06F 9/45533 713/2 |
| 2012/0330940 | A1 | 12/2012 | Caire et al. |
| 2013/0173648 | A1 | 7/2013 | Tan et al. |
| 2013/0290318 | A1 | 10/2013 | Shapira et al. |
| 2014/0046645 | A1* | 2/2014 | White ................... H04L 41/145 703/13 |
| 2014/0181705 | A1 | 6/2014 | Hey et al. |
| 2015/0082280 | A1 | 3/2015 | Betak et al. |
| 2015/0088982 | A1* | 3/2015 | Johnson .............. H04L 67/1004 709/203 |
| 2015/0113528 | A1 | 4/2015 | Kim et al. |
| 2015/0347284 | A1 | 12/2015 | Hey et al. |
| 2015/0350048 | A1* | 12/2015 | Sampat ............... H04L 43/0876 709/224 |
| 2015/0363224 | A1 | 12/2015 | Argenti et al. |
| 2015/0365349 | A1 | 12/2015 | Verma |
| 2016/0019049 | A1 | 1/2016 | Kakhandiki et al. |
| 2016/0078368 | A1 | 3/2016 | Kakhandiki et al. |
| 2016/0259654 | A1 | 9/2016 | Nychis et al. |
| 2016/0379010 | A1 | 12/2016 | Farkash et al. |
| 2017/0048170 | A1* | 2/2017 | Smullen ................. H04L 67/02 |
| 2018/0311815 | A1 | 11/2018 | Shaw et al. |
| 2019/0042286 | A1* | 2/2019 | Bailey ................. G06F 9/45504 |
| 2019/0303779 | A1 | 10/2019 | Briggle et al. |
| 2020/0057946 | A1* | 2/2020 | Singaraju ............... G06N 5/022 |

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

Bergen et al., RPC automation: making legacy code relevant, May 2013, 6 pages.

Hu et al., Automating GUI testing for Android applications, May 2011, 7 pages.

(56) References Cited

OTHER PUBLICATIONS

Konstantinou et al., An architecture for virtual solution composition and deployment in infrastructure clouds, 9 pages (Year: 2009).
Nyulas et al., An Ontology-Driven Framework for Deploying JADE Agent Systems, 5 pages (Year: 2008).
Tom Yeh, Tsung-Hsiang Chang, and Robert C. Miller, Sikuli: Using GUI Screenshots for Search and Automation, Oct. 4-7, 2009, 10 pages.
Yu et al., Deploying and managing Web services: issues, solutions, and directions, 36 pages (Year: 2008).
Zhifang et al., Test automation on mobile device, May 2010, 7 pages.
U.S. Appl. No. 16/925,956, filed Jul. 10, 2020, Sunil Dabhi.
International Search Report for PCT/US2020/030496.
International Search Report for PCT/US2020/030506.
Robert Nystrom, Game Programming Patterns, 2009, gameprogrammingpatterns.com/bytecode.html, pp. 1-26 (Year: 2009).
Written Opinion of the International Searching Authority for PCT/US2020/030496.
Written Opinion of the International Searching Authority for PCT/US2020/030506.

* cited by examiner

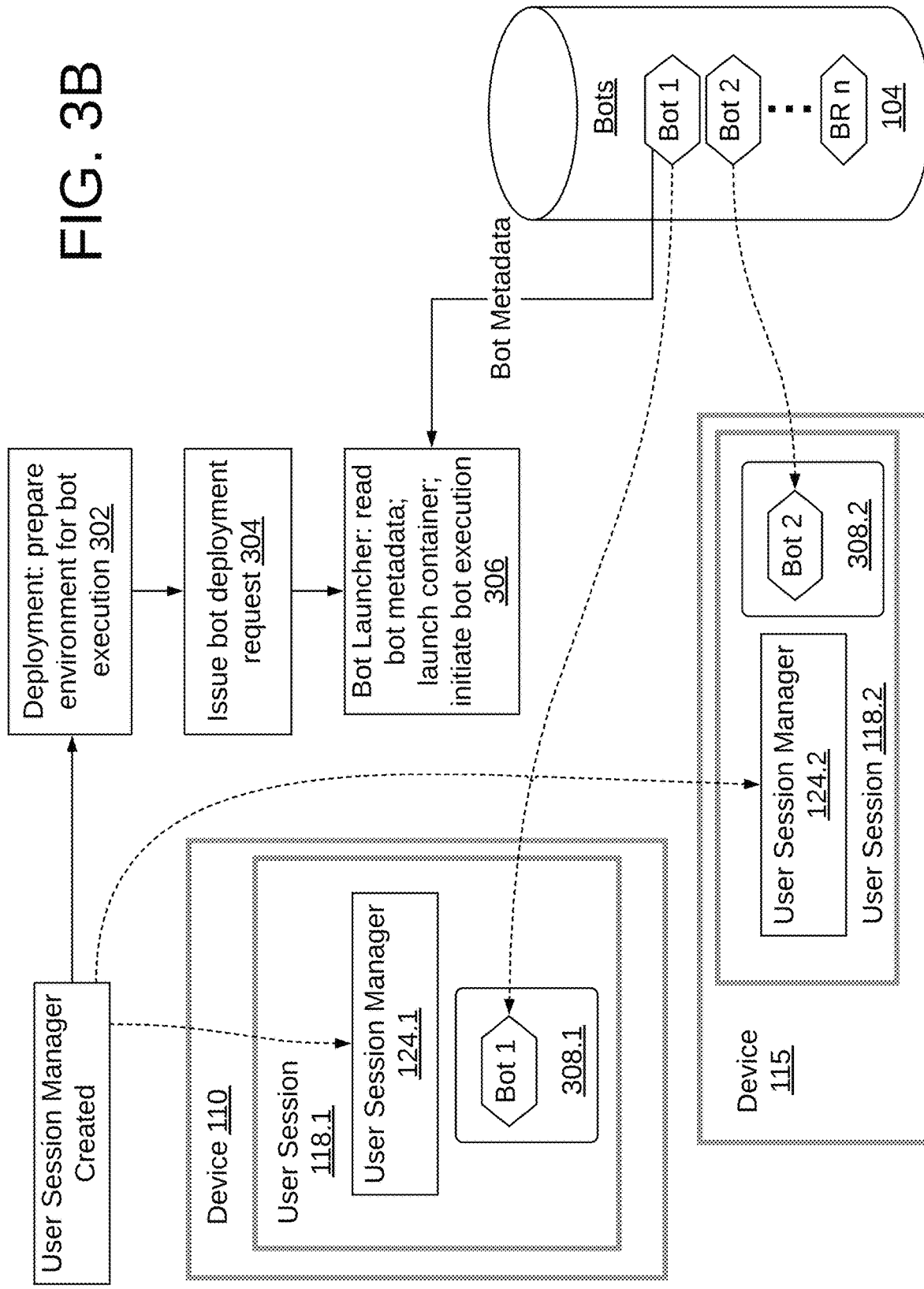

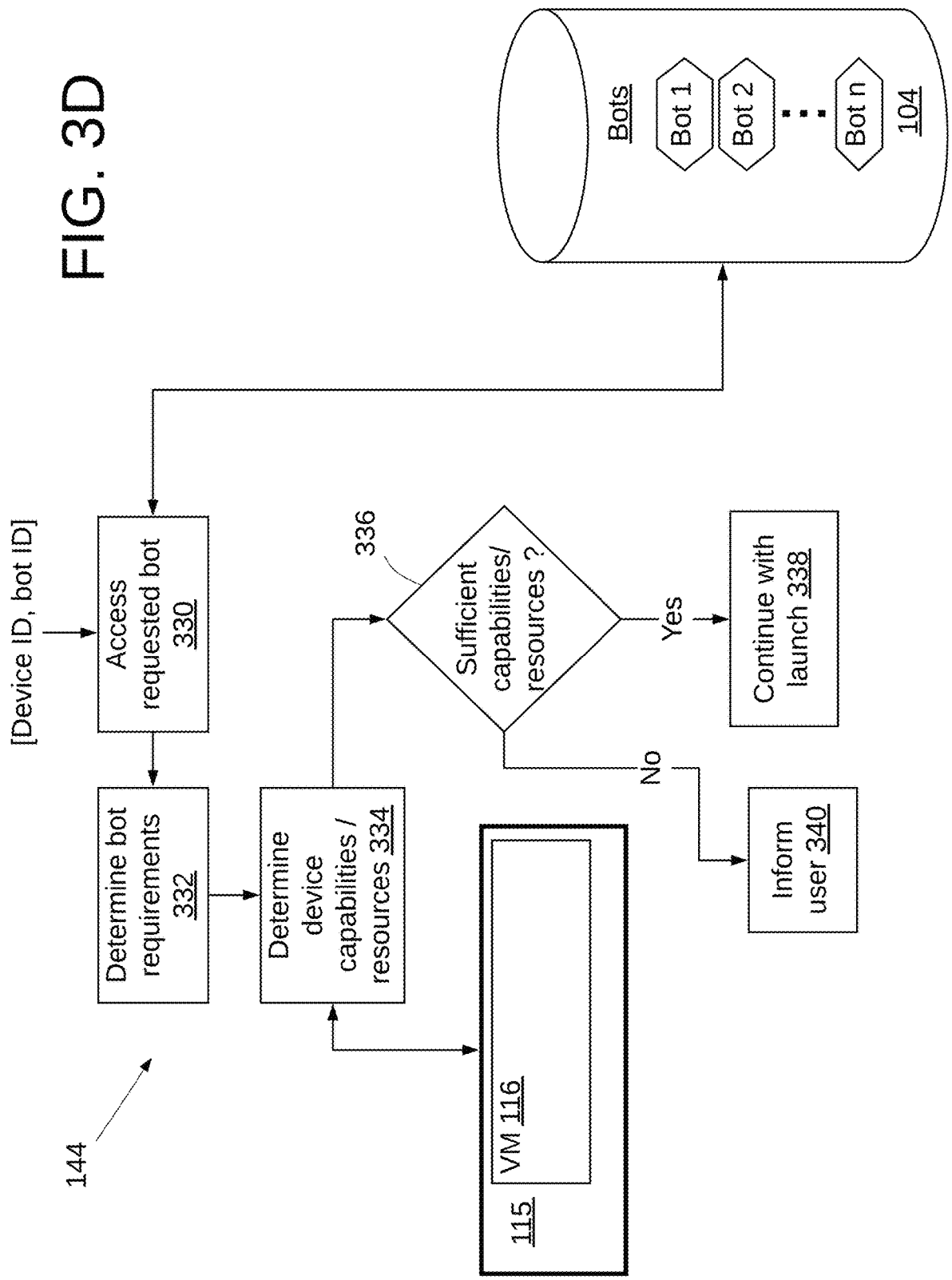

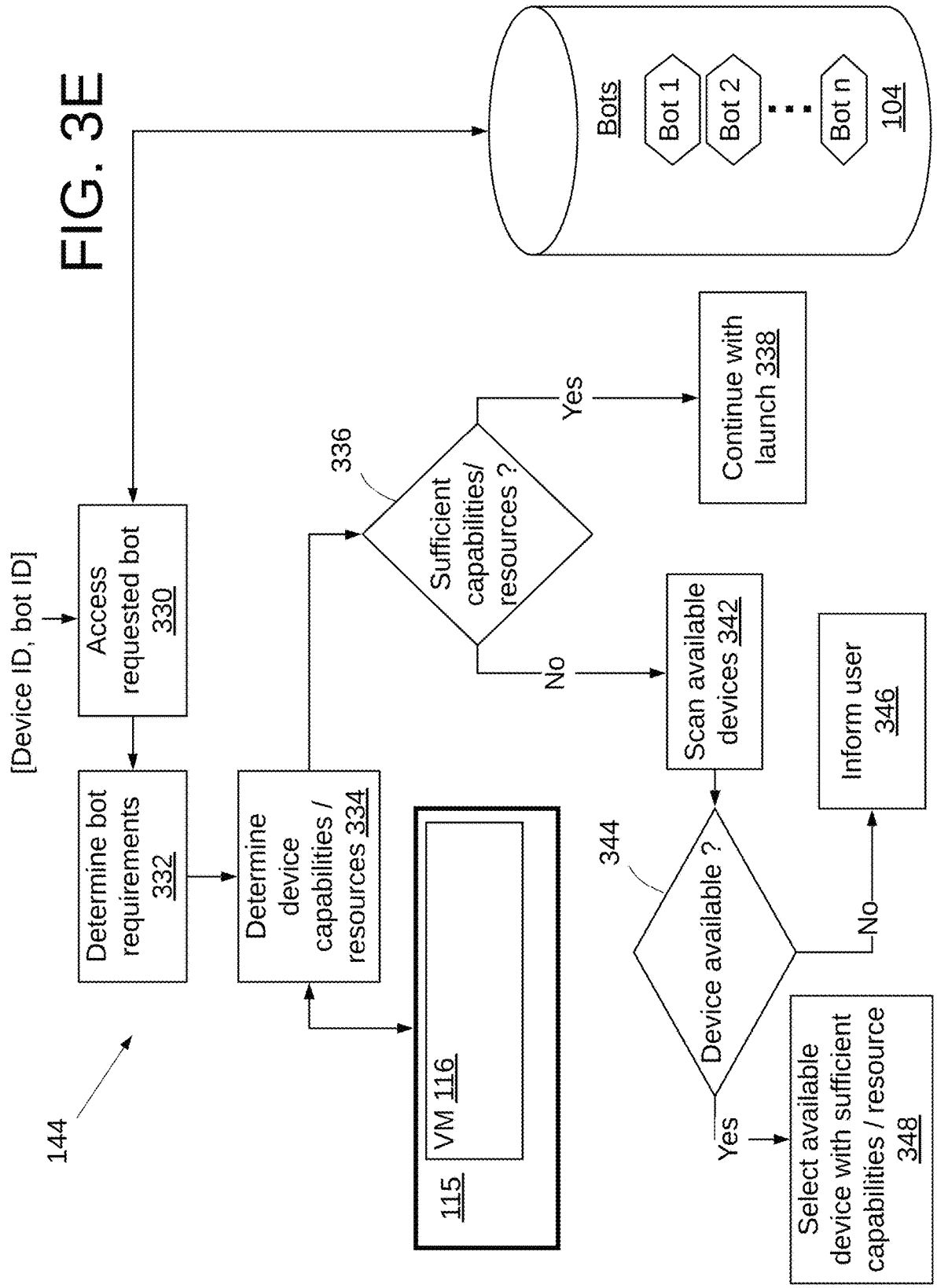

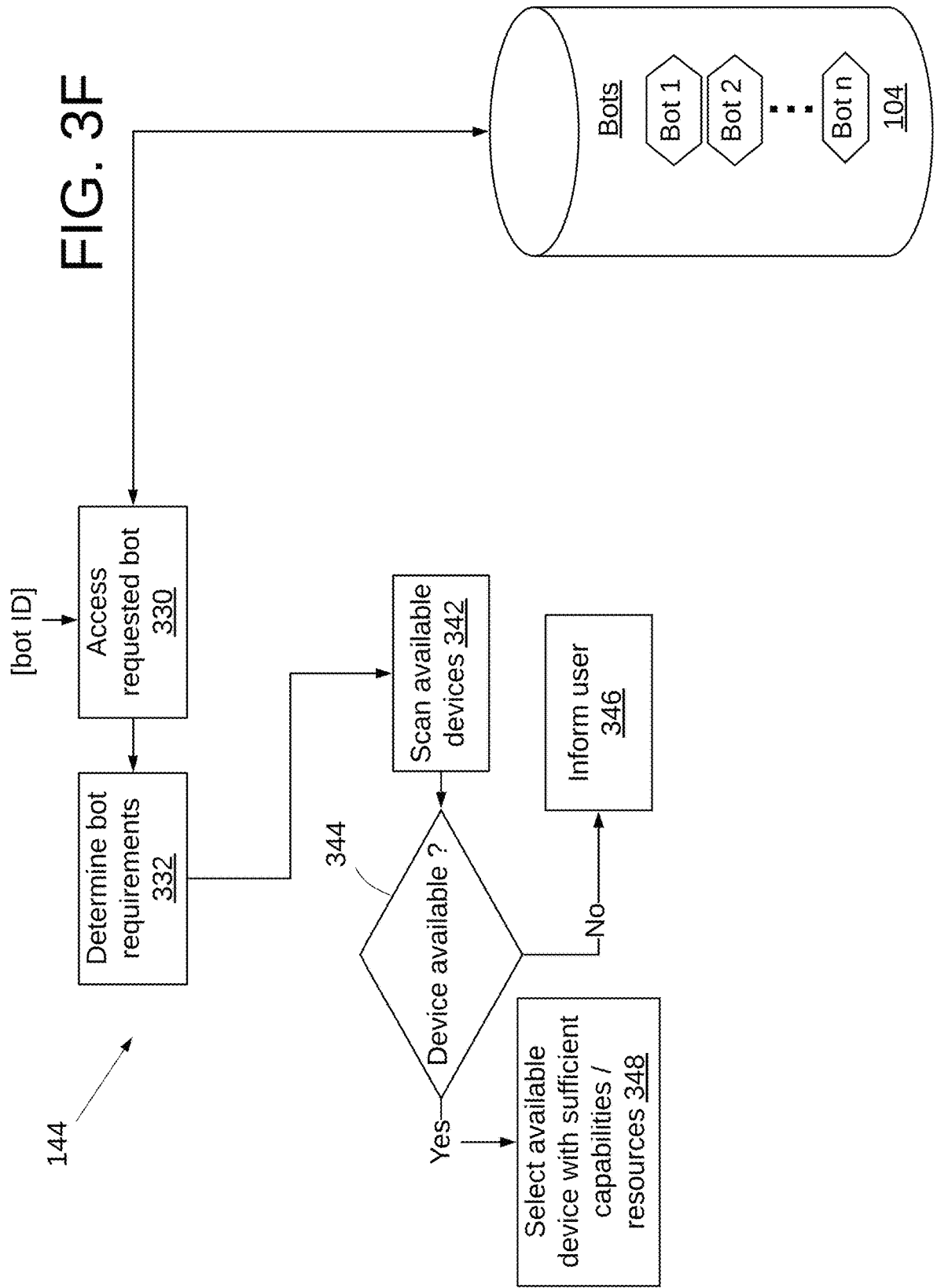

ROBOTIC PROCESS AUTOMATION SYSTEM WITH SEPARATE PLATFORM, BOT AND COMMAND CLASS LOADERS

RELATED APPLICATIONS

This application is a continuation-in-part of U.S. patent application entitled PLATFORM AGNOSTIC ROBOTIC PROCESS AUTOMATION, application Ser. No. 16/398,600, filed on Apr. 30, 2019, which application is related to U.S. patent application entitled ZERO FOOTPRINT ROBOTIC PROCESS AUTOMATION SYSTEM, application Ser. No. 16/398,532, filed on Apr. 30, 2019. Each of the aforementioned applications is hereby incorporated by reference in its entirety.

FIELD OF THE DISCLOSURE

This disclosure relates generally to the field of data processing systems and more particularly to robotic process automation systems.

BACKGROUND

Robotic process automation (RPA) is the application of technology that allows workers in an organization to configure computer software, known as a "robot" to capture and interpret existing applications for processing a transaction, manipulating data, triggering responses and communicating with other digital systems. The software robots in conventional RPA systems employ the software robots to interpret the user interface of third-party applications and to execute steps identically to a human user. For example, many tasks within organizations require individuals to perform the same repetitive tasks, such as entering data from invoices into an enterprise accounts payable application or entering data from a loan application into a loan processing system. RPA permits the automation of such application level repetitive tasks via software robots that are coded to repeatedly and accurately perform the repetitive task.

The software robots in conventional RPA systems execute on devices, physical or virtual, that are separate from an RPA server and which contain software to permit creation and/or execution of the software robot. While this has proven to be highly beneficial in facilitating data processing, the requirement for bot creation/execution software to be loaded onto different devices increases administrative complexity and can limit the processing capability of the RPA system. Moreover, because the software robots operate at an application level, as a human user would engage with such applications, conventional RPA systems are operating system dependent. A software robot encoded to perform tasks on, for example, a Windows® operating system, will need to be executed to perform the tasks for which it has been encoded on the Windows® operating system. This limitation can limit the scalability and increase the cost of deployment of an RPA system.

SUMMARY

Computerized RPA methods and systems that increase the flexibility, lower the cost and increase reliability with which RPA systems may be deployed are disclosed herein. A robotic process automation system includes data storage which stores a plurality of sets of task processing instructions. Each set of task processing instructions is operable to interact at a user level with one or more designated user level application programs. The data storage also stores a plurality of work items, where each work item is stored for subsequent processing by executing a corresponding set of task processing instructions. A server processor is operatively coupled to the data storage and is configured to execute instructions that cause the server processor to respond to a request to perform an automation task to process a work item from the plurality of work items, by initiating a java virtual machine on a second device. Also initiated on the second device is a first user session that employs credentials of a first user, for managing execution of the automation task. The server processor permits retrieval of the set of task processing instructions that correspond to the work item. The server processor loads into the java virtual machine, with a platform class loader, one or more modules, such as logging and security, that perform functions common to the sets of task processing instructions. A first class loader a first set of task processing instructions is also loaded. Then each instruction in the first set of task processing instructions is loaded with a separate class loader. The server processor causes execution, under control of the first user session, on the second device, the task processing instructions that correspond to the work item.

The platform class loader control of certain common functions (such as security and logging) of its child class loaders, such as the first class loader and the class loaders for each command, permits centralized control of key functions and ensures that each set of task processing instructions is sandboxed, i.e. limited to its own credential authorizations and cannot affect the activities of other sets of task processing instructions. This is just as a human user is limited to resources and activities permitted by their own credentials. Moreover, this approach is extended to each command where each class loader is a child of the parent class loader, thus permitting direct application of the platform class loader's common services and preventing override of such services by way of the task processing instruction's class loader. Furthermore, employing a separate class loader for each command limits the impact of implementation of each command. A class loaded for one command will not inadvertently control the same class name for another class loader, as would be the case by employing a common class loader for all commands in a set of task processing instructions.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIGS. 3A, 3B, 3C, 3D, 3E and 3F illustrate operation of various modules of the RPA system of FIG. 1.

DETAILED DESCRIPTION

In the following detailed description, reference will be made to the accompanying drawings, in which identical functional elements are designated with like numerals. Elements designated with reference numbers ending in a suffix such as 0.1, 0.2, 0.3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
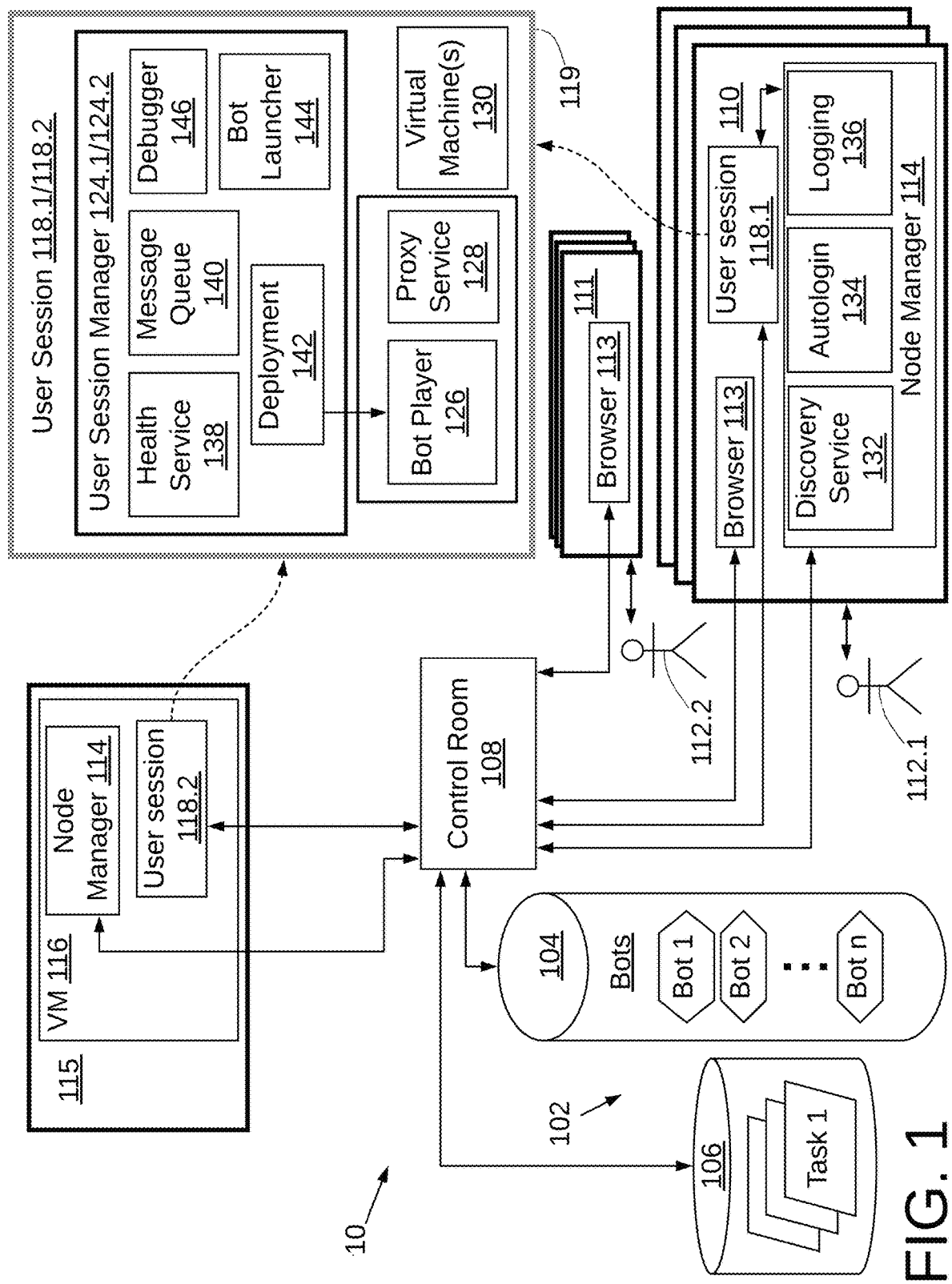
FIG. 1 is a high-level block diagram of an embodiment of an RPA system with server-based bot creation and execution.

In FIG. 1, the embodiments disclosed herein implement a robotic process automation system 10 that includes data storage, seen generally at 102 which stores a plurality of sets of task processing instructions 104. Each set of task processing instructions 104 implements a software robot, also referred to as a bot (seen as Bot 1, Bot 2, . . . , Bot n) which is operable to interact at a user level with one or more designated user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 126), on which a bot will execute or is executing. The data storage 102 also stores a plurality of work items 106, where each work item 106 is stored for subsequent processing by executing a corresponding set of task processing instructions 104. A control room, seen generally at 108, is operatively coupled to the data storage 102 and is configured to execute instructions that when executed cause the RPA system 10 to respond to a request from a client device 110 that is issued by a user 112.1 to act as a server to provide to the client device 110 the capability to perform an automation task to process a work item from the plurality of work items 106. For simplicity of illustration and explanation, a single client device 110 is shown in detail.

The RPA system 10 preferably is able to support multiple client devices 110 concurrently, each of which will have one or more corresponding user session(s) 118, which provides a context. The context includes security, permissions, audit trails, etc. to define the permissions and roles for bots operating under the user session 118. For example, a bot executing under a session, cannot access any files or use any applications that the user under whose credentials the bot is operating does not have permission to do so. This prevents any inadvertent or malicious acts from a bot under which a bot 104 executes.

The control room 108 provides to the client device 110, software code to implement a node manager 114 that executes on the client device 110 and which provides to a user 112 a visual interface via browser 113 to view progress of and to control execution of the automation task. It should be noted here that the node manager 114 is provided to the client device 110 on demand, when required by the client device 110 to execute a desired automation task. In one embodiment, the node manager 114 may remain on the client device 110 after completion of the requested automation task to avoid the need to download it again. In another embodiment, the node manager 114 may be deleted from the client device 110 after completion of the requested automation task. The node manager 114 also maintains a connection to the control room 108 to inform the control room 108 that device 110 is available for service by the control room 108, irrespective of whether a live user session 118 exists. When executing a bot 104, the node manager 114 impersonates the user 112 by employing credentials associated with the user 112. In certain embodiments, the system 10 employs user impersonation as described in U.S. Patent Applications entitled ROBOTIC PROCESS AUTOMATION SYSTEM WITH DEVICE USER IMPERSONATION filed on Mar. 31, 2019, assigned application Ser. No. 16/371,046, which application is assigned to the assignee of the present application and which is hereby incorporated by reference in its entirety. In application Ser. No. 16/371,046 the term "bot runner" is used in the manner that the term "bot" is used in the present application.

The control room 108 initiates on the client device 110, a user session 118 (seen as a specific instantiation 118.1) to perform the automation task. The control room 108 retrieves the set of task processing instructions 104 that correspond to the work item 106. The task processing instructions 104 that correspond to the work item 106 execute under control of the user session 118.1, on the device 110. The node manager 114 provides update data indicative of status of processing of the work item to the control room 108. The control room 108 terminates the user session 118.1 upon completion of processing of the work item 106. User session 118.1 is shown in further detail at 119, where an instance 124.1 of user session manager 124 is seen along with a bot player 126, proxy service 128 and one or more virtual machine(s) 130, such as a virtual machine that runs Java® or Python®. The user session manager 124 provides a generic user session context within which a bot 104 executes.

The bots 104 execute on a player, via a computing device, to perform the functions encoded by the bot. Additional aspects of operation of bots may be found in the following pending patent application, which refers to bots as automation profiles, System and Method for Compliance Based Automation, filed in the U.S. Patent Office on Jan. 6, 2016, and assigned application Ser. No. 14/988,877, which is hereby incorporated by reference in its entirety.

Some or all of the bots 104 may in certain embodiments be located remotely from the control room 108. Moreover, the devices 110 and 111 may also be located remotely from the control room 108. The bots 104 and the tasks 106 are shown in separate containers for purposes of illustration but they may be stored in separate or the same device(s), or across multiple devices. The control room 108 performs user management functions, source control of the bots 104, along with providing a dashboard that provides analytics and results of the bots 104, performs license management of software required by the bots 104 and manages overall execution and management of scripts, clients, roles, credentials, and security etc. The major functions performed by the control room 108 include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management permits checking status of tasks in progress and history of all tasks, and permits the administrator to stop/start execution of hots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 108 is shown generally for simplicity of explanation. Multiple instances of the control room 108 may be employed where large numbers of bots are deployed to provide for scalability of the RPA system 10.

In the event that a device, such as device 111 (seen operated by user 112.2) does not satisfy the minimum processing capability to run node manager 114, the control room 108 provides on another device, such as device 115, that has the requisite capability, within a Virtual Machine (VM), seen as VM 116 that is resident on the device 115, a node manager 114 that is in communication with browser 113 on device 111. This permits RPA system 10 to operate with devices that may have lower processing capability, such as older laptops, desktops, and portable/mobile devices such as tablets and mobile phones. In certain embodiments browser 113 may take the form of a mobile application stored on the device 111. The control room 108 establishes a user session 118.2 for the user 112.2 while interacting with the control room 108 and the corresponding user session 118.2 operates as described above for user session 118.1, with user session manager 124 as described above in connection with device 110.

In certain embodiments, the user session manager 124 provides five functions. First is a health service 138 that maintains and provides a detailed logging of bot execution including monitoring memory and CPU usage by the bot and other parameters such as number of file handles employed. The bots 104 employ the health service 138 as a resource to pass logging information to the control room 108. Execution of the bot is separately monitored by the user session manager 124 to track memory, CPU and other system information. The second function provided by the user session manager 124 is a message queue 140 for exchange of data between bots executed within the same user session 118. Third is a deployment service 142 that connects to the control room 108 to request execution of a requested bot 104. The deployment service 142 also ensures that the environment is ready for bot execution such as by making available dependent libraries. Fourth is a bot launcher 144 which reads metadata associated with a requested bot 104 and launches an appropriate container and begins execution of the requested bot. Fifth is a debugger service 146 that can be used to debug bot code.

The bot player 126 executes, or plays back, the sequence of instructions encoded in a bot. The sequence of instructions is captured by way of a recorder when a human performs those actions, or alternatively the instructions are explicitly coded into the bot. These instructions enable the bot player 126, to perform the same actions as a human would do in their absence. The instructions are composed of a command (action) followed by set of parameters, for example: Open Browser is a command, and a URL would be the parameter for it to launch the site. Proxy service 128 enables the integration of external software or applications with the bot to provide specialized services. For example, an externally hosted artificial intelligence system could enable the bot to understand the meaning of a "sentence"

The user 112 interacts with node manager 114 via a conventional browser 113 which employs the node manager 114 to communicate with the control room 108. When for the first time 112 user logs from client device 110 onto the control room 108, they are prompted to download and install the node manager 114 on the device 110, if one is not already present. The node manager 114 establishes a web socket connection to the user session manager 124, deployed by the control room 108 that lets the user 112 subsequently create, edit and deploy the bots 104.

Figure 2:
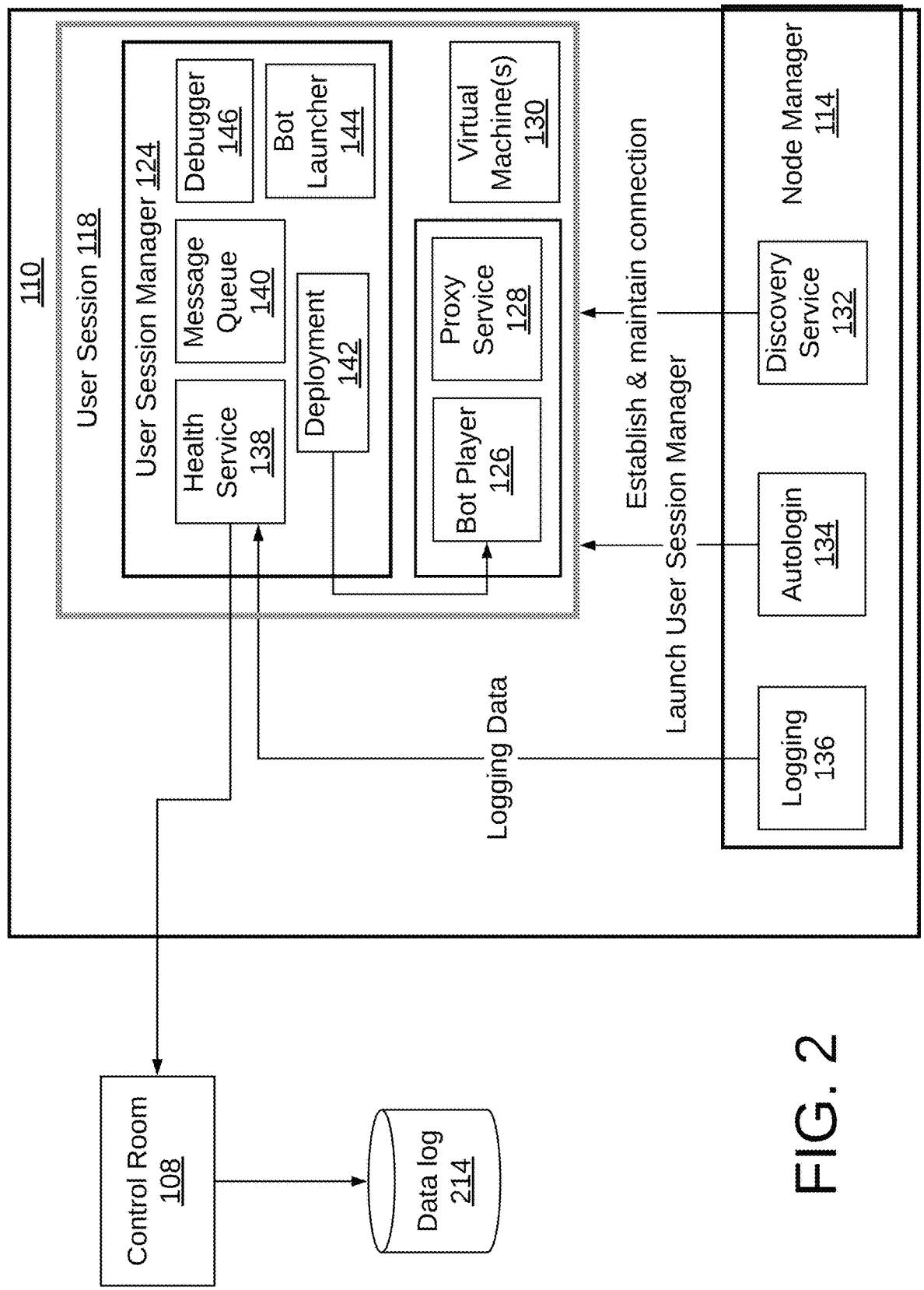
FIG. 2 illustrates commands exchanged between a client device and a server in the RPA system of FIG. 1.

The node manager 114 which is provided to the device 110 by the control room 108, in certain embodiments provides three functions, as illustrated in FIG. 2. First is a discovery service 132 that establishes and maintains a connection to the control room 108 and acts as a resource to the control room 108 for the device 110. Second, the node manager 114 provides an autologin service 134 that provides a vehicle to allow the control room 108 to login or to create a user session 118 by launching user session manager 124 which works with the control room 108 to serve control room requests. Third, the node manager 212 provides a logging function 136 to provide a single, centralized point for streaming of all logging data back to the control room 108, via the health service 138, which stores the received log data to a data log 214.

Figure 3A:
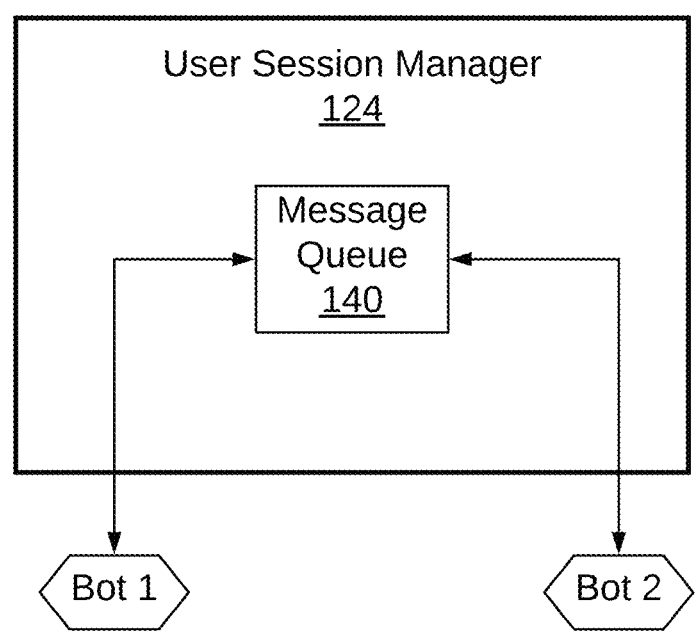

Operation of the message queue 140 is illustrated in FIG. 3A. The basic exchange of data between bots, Bot 1 and Bot 2, that that are executed within the same user session is performed using message queue 140. Furthermore, the message queue 140 can be used as the mechanism to synch-up between different code blocks or between parallel execution of bots in the same user session. In one embodiment, there is no persistence of queue data, once the user session is killed, the queue is lost. In such an embodiment, for more long-term and exchange of data across different user sessions or between bots across different client devices 110, alternative messaging may be employed such as by use of JavaScript Object Notation (JSON objects).

Initiation of execution of a bot 104 is illustrated in FIG. 3B which shows two user sessions (118.1, 118.2) created on two devices. User session managers 124.1 and 124.2 at 301 initiate, in devices 110 and 115 respectively, user sessions 118.1 and 118.2, under control of deployment module 142, for bot execution. The deployment module 142 at 302 prepares the user session 118 for execution by setting up the environment needed for the bot execution. This includes setting up appropriate path variables, that the bot may call upon while executing. This ensures that all dependencies, like external libraries, are available for the bot to execute. At 304 the bot deployment module 142 issues bot deployment requests to the control room 108. The control room 108 responds by retrieving the requested bot, Bot 1 and providing it to user session manager 124.1 which is executing on device 110. In the case of device 111 which does not have the capability to execute the node manager 114, another device is selected, device 115 in this case, upon which the node manager will execute to permit the user session manager 124 to initiate user session 118.2 to execute Bot 2. At 306, the bot launcher 144 in user session manager 124.1 reads the metadata for Bot 1 and launches a container 308.1 within which Bot 1 will execute, and then initiates execution of Bot 1. Similar actions are performed by a bot launcher executing within user session 118.2 on device 304 to initiate execution of Bot 2.

Figure 3C:
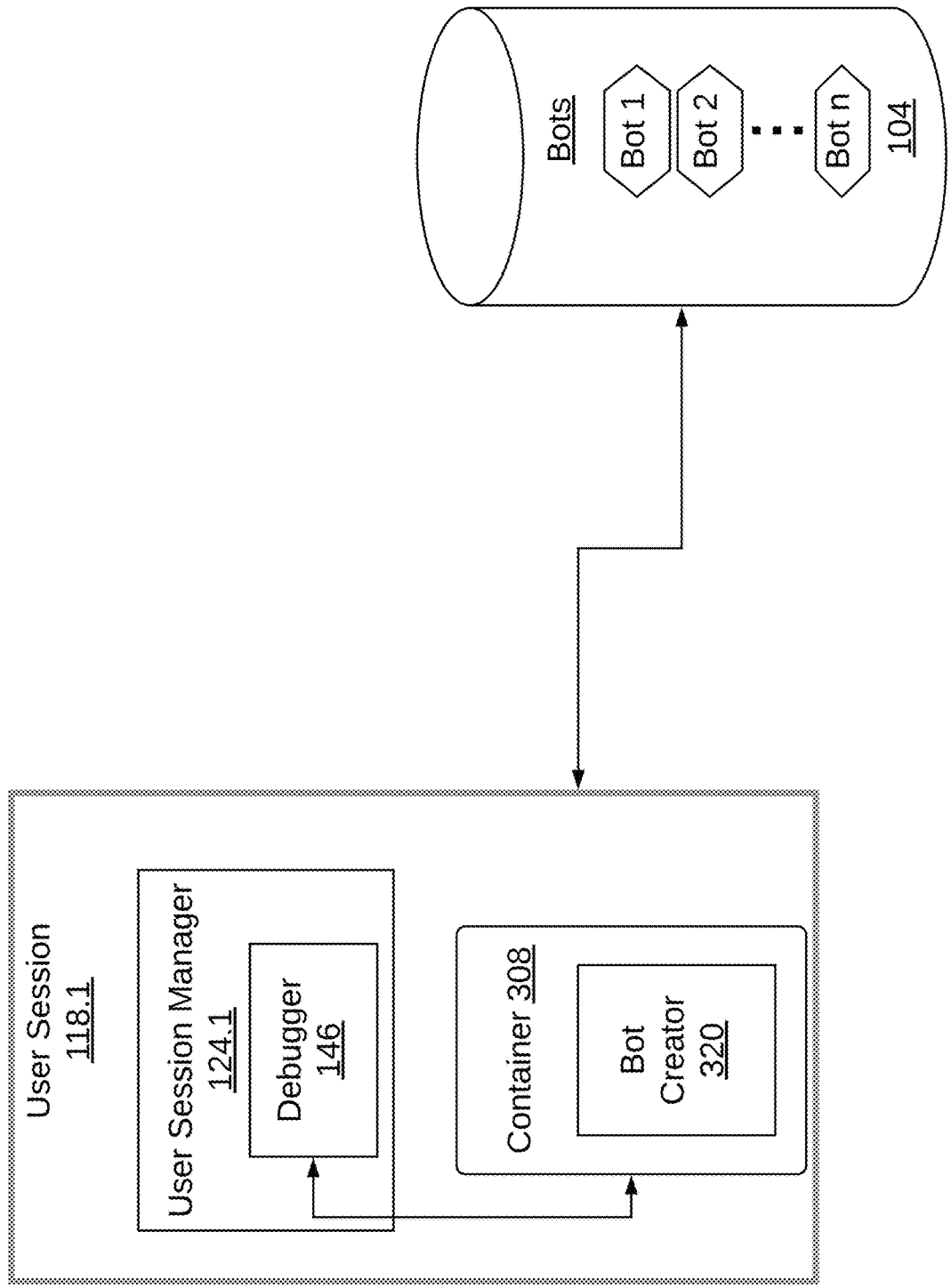

Operation of the debugger 146 is seen in FIG. 3C. If the user 112 is logged into the control room 108 as a bot creator employing a bot creator 320, they may debug with debugger 146 the code of a selected bot 104. The debugger 146 enables the bot creator to step-through the instructions in the bot and ensure that it is working as designed or created. The debugger 146 interactively provides the state of various variables, input and output parameters, allowing the creator to fix any errors discovered during the bot testing.

FIGS. 3D, 3E and 3F are flow diagrams illustrating operation of certain aspects of three embodiments of bot launcher 144. In FIG. 3D, the bot launcher 144, upon receiving an identifier for a bot 104 requested by user 112 (such as for example Bot 1) and an identifier for a device requested by user 112, accesses at 330 the requested bot to identify at 332 requirements encoded within the requested bot that specify capabilities and resources required for the requested bot to execute its programmed instructions. The capabilities and resources may be explicitly identified within the requested bot and/or the bot launcher 144 may scan the coding in the requested bot to automatically determine some or all of the required capabilities and resources. Capabilities and resources required by the bot 104 may include minimum processing, storage, communications capabilities, access to required services, such as hosted applications (e.g. various enterprise resource planning or customer relationship management applications), various files that may be required, and application programs that may be required to be installed such as for example, Microsoft Office® applications (Word®, Excel®, Outlook®, Powerpoint®). Capabilities and resources, as just described, of the requested device are determined at 334. If the capabilities/resources of the requested device are determined at 336 to be sufficient to execute the requested bot the bot launcher 144 continues with other required operations to launch the requested bot. Otherwise, the user 112 is notified at 340 so that another device may be requested.

FIG. 3E illustrates operation of another embodiment of bot launcher 144 where the bot launcher 144, automates the process of identifying an available device with the capabilities/resources required by a requested bot. At 336, if the requested device does not have the required capabilities/resources then at 342, the bot launcher performs a scan of available devices as maintained by control room 108. If any devices are not currently available, the user 112 is informed at 346. If at 344 it is determined that one or more devices with sufficient capabilities/resources is/are currently available, the bot launcher 144 selects one of such devices at 348 and the bot launcher 144 continues with other required operations to launch the requested bot.

FIG. 3F illustrates operation of another embodiment of bot launcher 144 where the bot launcher 144, fully automates the process of identifying an available device with the capabilities/resources required by a requested bot. In FIG. 3F, the bot launcher receives at 330 only the identification of the requested bot and identifies, at operations 342, 344 and 348, an available device with sufficient capabilities/resources. In the embodiments of FIGS. 3D, 3E and 3F the devices scanned and selected may be physical devices and/or virtual devices such as described below in connection with FIG. 4.

Figure 4:
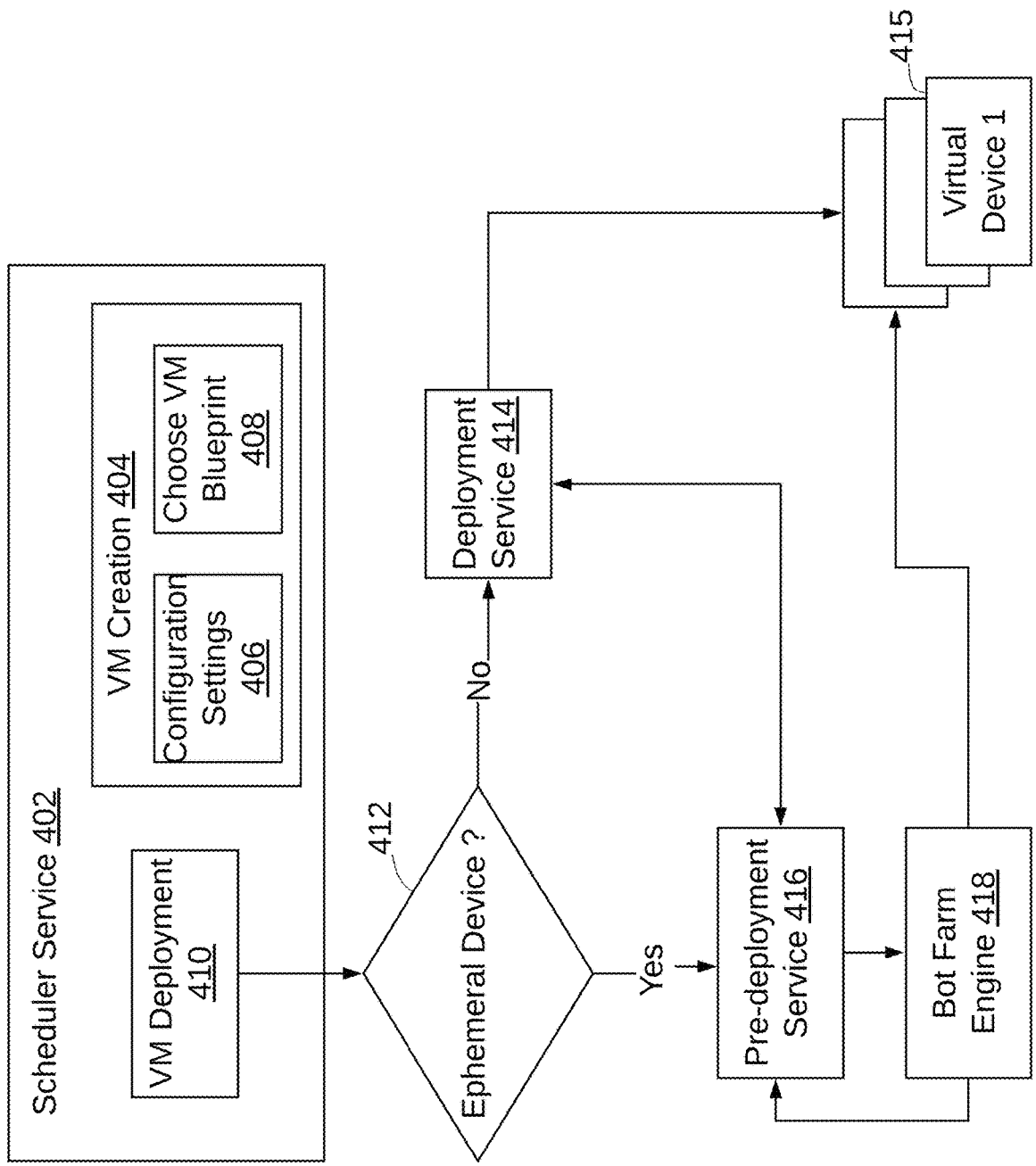
FIG. 4 illustrates a bot farm service that maybe used in connection with the RPA system of FIG. 1.

FIG. 4 illustrates a bot farm service that maybe used in connection with the RPA system of FIG. 1 to employ virtualization to provide larger scale bot processing capability. The scheduler service 402 provides for virtual machine (VM) creation 404 and VM deployment 410. VM creation 404 permits selection of configuration settings 406 where a time can be specified when the scheduler service 402 creates a VM image (i.e. virtual device 415). VM creation 404 also permits selection of a template or blueprint that contains specification for the VM such as processing capability, and memory and storage size. A user may employ the VM deployment module 410 to schedule a particular bot to run on an n number of VMs (for example n=100). Embodiments disclosed herein support a category of VM termed herein an "ephemeral device" which is a device that exists only for the duration of bot execution. To deploy devices, the scheduler at 412 determines if one or more of the devices requested to be deployed is an ephemeral device. If not, then deployment service 414 deploys the requested device(s). If a requested device is determined at 412 to be an ephemeral device then predeployment service 416 is employed to create the requested ephemeral device(s) in accordance with criteria specified by way of a blueprint that specifies required processing capabilities, storage capabilities and software requirements, such as application programs required to be installed on the ephemeral device. These ephemeral devices will then show-up as devices connected and available—these devices would then be associated with bot deployment metadata. Deployment service is then employed to deploy the ephemeral device(s). The bot farm engine 418 is a service that enables creating virtual machines on-demand using a native Application Program Interface (API) provided by a cloud provider. It instantiates VM's that can then be used to run/play the bots. The bot farm engine 418 uses templates or blueprints (pre-generated) that define the configuration of the VM that needs to be created. These VM's are virtual devices for playing the bots. On completion of the execution of the bots, the user session manager 124 from the respective devices indicate the completion, and control room 108 can then reclaim the virtual machines by spinning them down and closing them.

Figure 5:
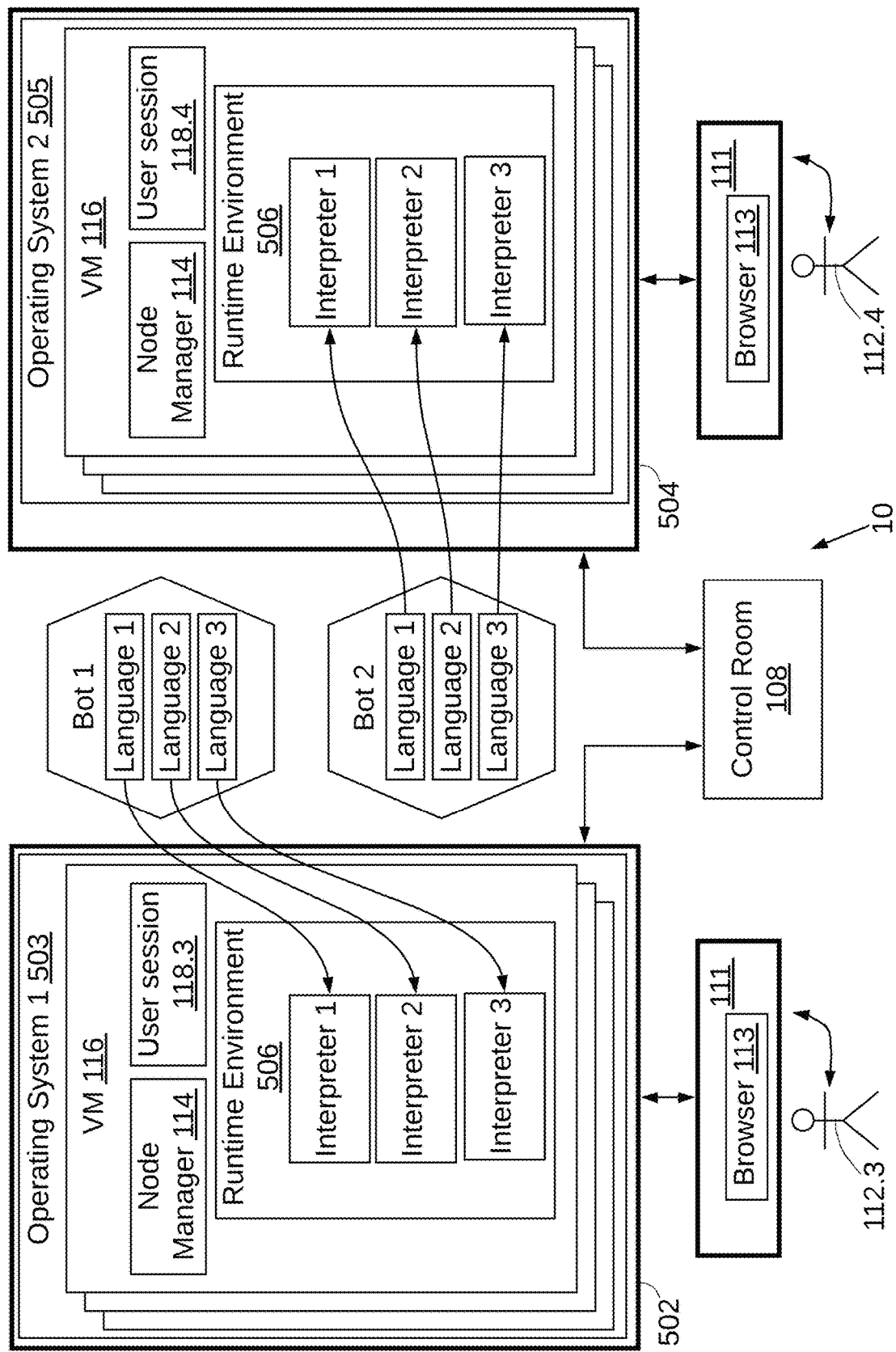
FIG. 5 illustrates a second embodiment of the RPA system of FIG. 1.

FIG. 5 illustrates a second embodiment of the RPA system of FIG. 1 which operates to provide a generalized runtime environment for digital workers. This flexible runtime environment advantageously permits extensibility of the platform to enable use of various languages in encoding bots. In the embodiment of FIG. 5, RPA system 10 operates in the manner described in connection with FIG. 1 and its accompanying figures, except that in the embodiment of FIG. 5, some or all of the user sessions 118 execute within a virtual machine 116. This permits the bots 104 to operate on an RPA system 10 that runs on an operating system different from an operating system on which a bot 104 may have been developed. For example, if a bot 104 is developed on the Windows® operating system, the platform agnostic embodiment of FIG. 5 permits bot 104 to be executed on a device 502 or 504 executing an operating system, 503/505 different than Windows®, such as for example, Linux. In one embodiment the VM 116 takes the form of a Java Virtual Machine (JVM) such as provided by the Oracle Corporation. As will be understood by those skilled in the art in view of the present disclosure, a JVM enables a computer to run Java® programs as well as programs written in other languages that are also compiled to Java® bytecode.

In the embodiment of FIG. 5, multiple devices 502 execute operating system 1, 503, which may for example be a Windows® operating system. Multiple devices 504 execute operating system 2, 505, which may for example be a Linux® operating system. For simplicity of explanation, two different operating systems are shown, by way of example and additional operating systems such as the macOS®, or other operating systems may also be employed on devices 503, 505 or other devices. Each device 503, 505 has installed therein one or more VM's 116, each of which executes its own operating system (not shown), which may be the same or different than the host operating system 503/505. Each VM 116 has installed upon it, either in advance, or on demand from control room 108, a node manager 114. Except as specifically noted herein, the embodiment of FIG. 5 operates as described above in connection with FIGS. 1, 2, 3A, 3B, 3C, 3D, 3E, 3F and 4 and reference is made to those figures and accompanying description for the detailed operation of control room 108, node manager 114 and user sessions 118 and user session manager 124. The embodiment of FIG. 5 differs from that in FIG. 1 in that the devices 502 and 504 have installed thereon one or more VMs 116 as described above, with each VM 116 having installed thereon an operating system that may or may not be compatible with an operating system required by an automation task. Moreover, each VM has installed thereon a runtime environment 506, each of which has installed thereon one or more interpreters (shown as interpreter 1, interpreter 2, interpreter 3). Three interpreters are shown by way of example but any run time environment 506 may at any given time have installed thereupon less than or more than three different interpreters. Each interpreter 506 is specifically encoded to interpret instructions encoded in a particular programming language. For example, interpreter 1 may be encoded to interpret software programs encoded in the Java® programming language, seen as language 1 in Bot 1 and Bot 2. Interpreter 2 may be encoded to interpret software programs encoded in the Python® programming language, seen as language 2 in Bot 1 and Bot 2, and interpreter 3 may be encoded to interpret software programs encoded in the R programming language, seen as language 3 in Bot 1 and Bot 2.

Turning to the bots Bot 1 and Bot 2, each bot may contain instructions encoded in one or more programming languages. In the example shown in FIG. 5, each bot contains instructions in three different programming languages, for example, Java®, Python® and R. This is for purposes of explanation and the embodiment of FIG. 5 may be able to create and execute bots encoded in more or less than three programming languages. The VMs 116 and the runtime environments 506 permit execution of bots encoded in multiple languages, thereby permitting greater flexibility in encoding bots. Moreover, the VMs 116 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 108 will select a device with a VM 116 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 6B:
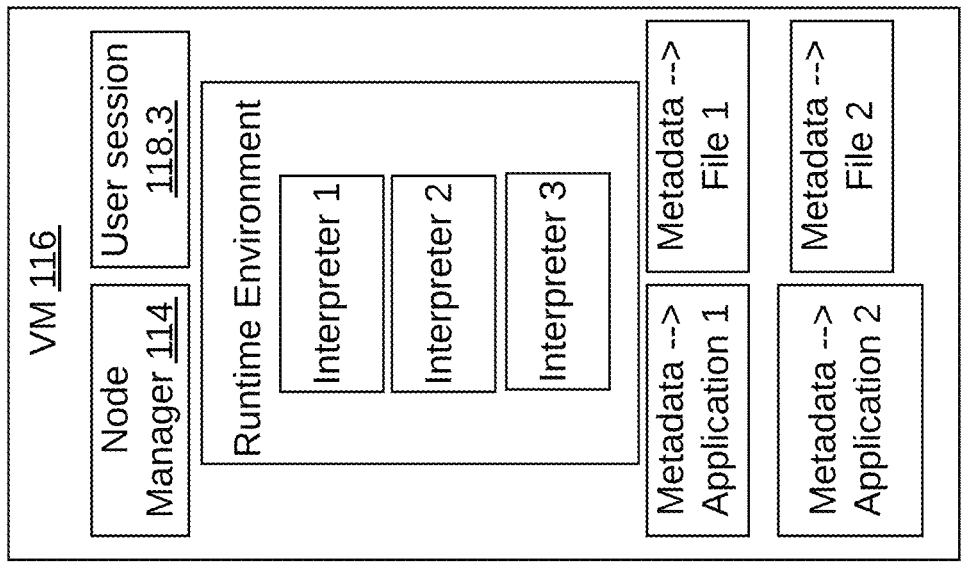
FIGS. 6A and 6B illustrate embodiments of virtual machine configurations.
Figure 6A:
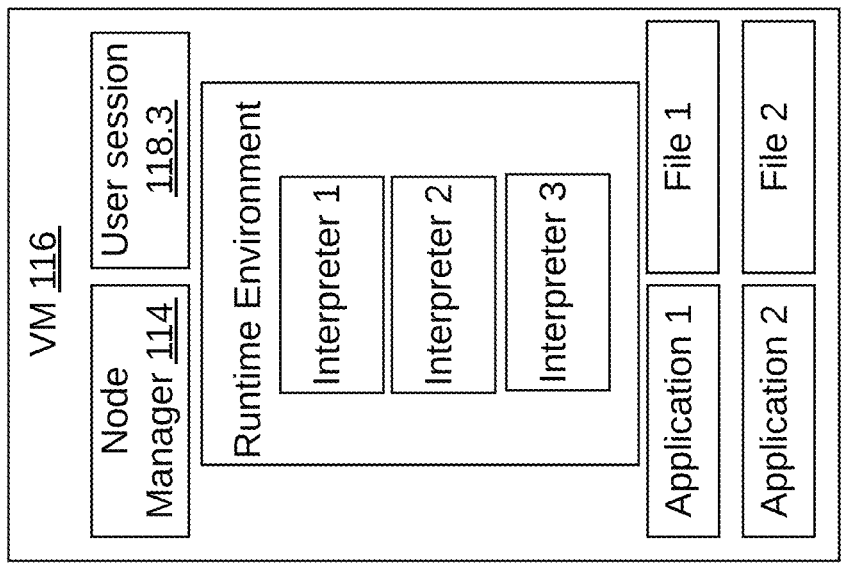

In one embodiment, seen in FIG. 6A the VM 116 may be pre-created with all dependencies, such as application 1, application 2, and two files, file 1 and file 2, that a bot 104 may need. In another embodiment, seen in FIG. 6B, the bot 104 may have all dependencies clearly defined as metadata in the bot definition to enable access to and/or retrieval of required resources such as applications (application 1, application 2), files (file 1, file 2), and access information (e.g. login credentials) to various services. Deployment service 142 can use this metadata information to setup the environment. This permits the bot 104 to be more compact in size. The dependencies define resources or information needed for a bot to execute. For example, the bot may need $3^{rd}$ party libraries, or certain configuration settings that are encoded in a separate file and that needs to be present at a location for the bot to consume and execute successfully. In certain embodiments, to manage and authorize bot execution within the confines of the node managers 114, the system 10 needs the ability to disallow bot execution via any other means. In such embodiments, a ClassLoader, as employed in the Java® programming language, within the generated code (as a preamble) is used to ping the local agent to dynamically load a class to execute. In case, this bot is executed elsewhere, the call to ClassLoader will fail preventing the bot from execution. This is to prevent the generated byte code being executed independently external to the bot runner/player. Given that the bot is encoded in Java Byte code, it is desirable to prevent any external Java® runtime virtual machine from directly executing the byte code.

Figure 7:
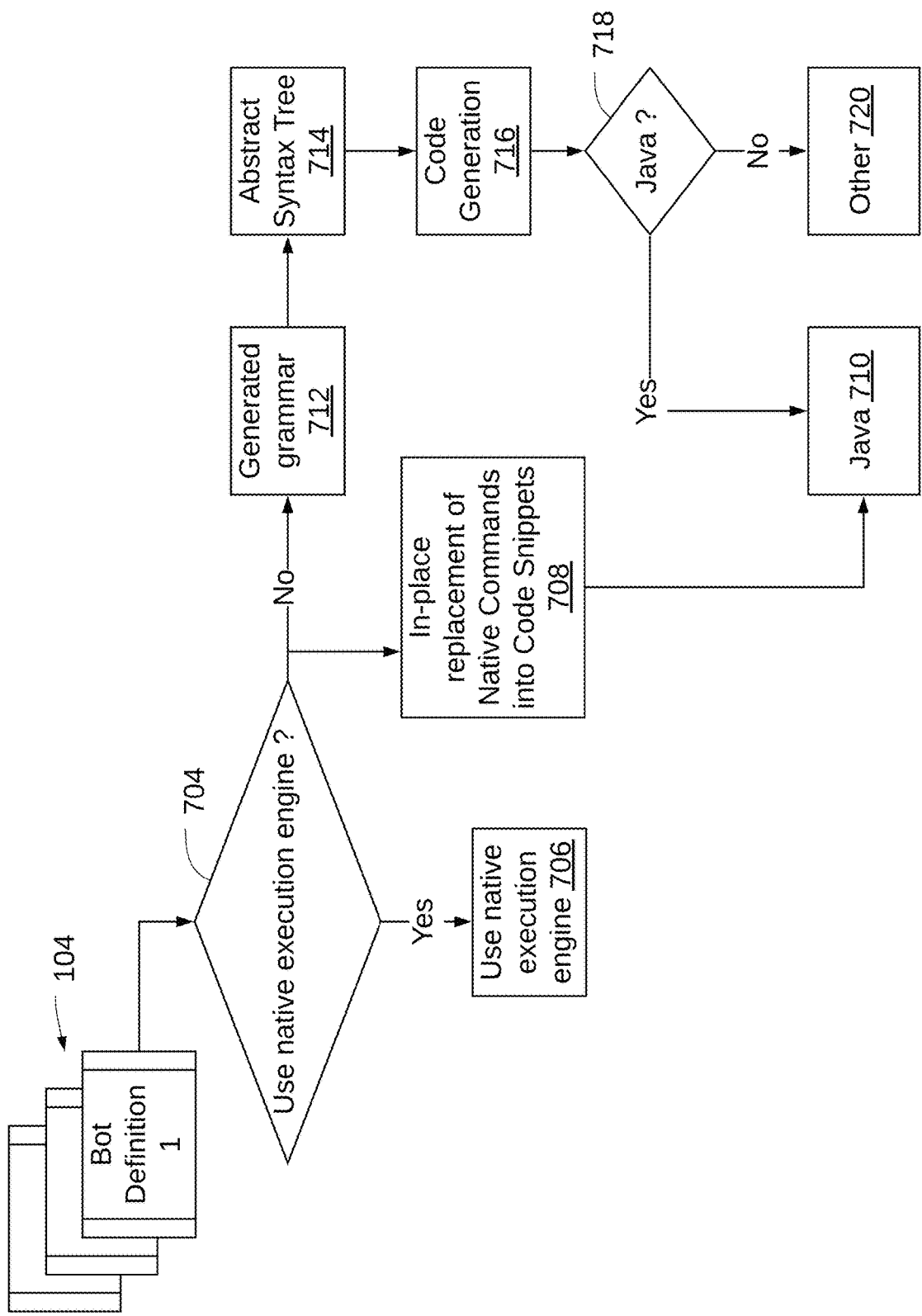
FIG. 7 illustrates an embodiment of code translation that may be employed by the embodiment of the RPA system in FIG. 5.

The code in a bot 104 that is encoded in a language other than Java® may be converted by the control room 108 to Java®, or another language, in the manner set shown in FIG. 7. For example, if a bot 104 is encoded with commands suitable for the Windows® operating system, the operations shown in FIG. 7 can be employed by the RPA system 10 to convert the bot to Java®, or another language to enable the bot 104 to execute on an operating system other than Windows®. In FIG. 7, a test is performed at 704 to determine if a bot 104 selected for execution should be executed by a native execution engine, in other words, if the bot 104 can be executed without translation of its encoded instructions. In one embodiment, the control room automatically makes a determination as to whether to use a native execution engine 706. In such an embodiment, if the control room 108 has the capability to execute the bot 104 natively then it employs the native execution capability. If the control room 108 does not have the capability to execute the bot 104 natively then the instructions in the bot 104 may be converted in two different ways. One conversion technique is shown at 708 where an in-place replacement of native commands with Java® code snippets is performed. This involves a straightforward replacement of a native command for a first platform, e.g. Windows®, into a code snippet for a second platform, e.g. Java®. In some embodiments, the control room 108 may have the capability to perform translation by way of an alternative technique seen at 712, 714, 716, 718 and 720, which permits translation into a language other than Java® if needed. In such an embodiment, such a translation will be the default unless overridden by an administrator or user 102. The instructions in the bot 104 are deconstructed at 712 and mapped at 714 to an abstract syntax tree and then generated to target code at 716 and 718 into Java® 710 or some other code 720 The abstract syntax tree is a data structure for representing bot instructions in a language neutral form and is machine readable. This allows for bot creation to be independent or agnostic of the language in which it needs to be executed. In the event that new commands are added, the corresponding commands and the associated snippet can be obtained by the control room 108 on demand by from a centralized repository that distributes new commands, such as for example from GitHub.com hosted by Automation Anywhere, Inc.

Figure 8:
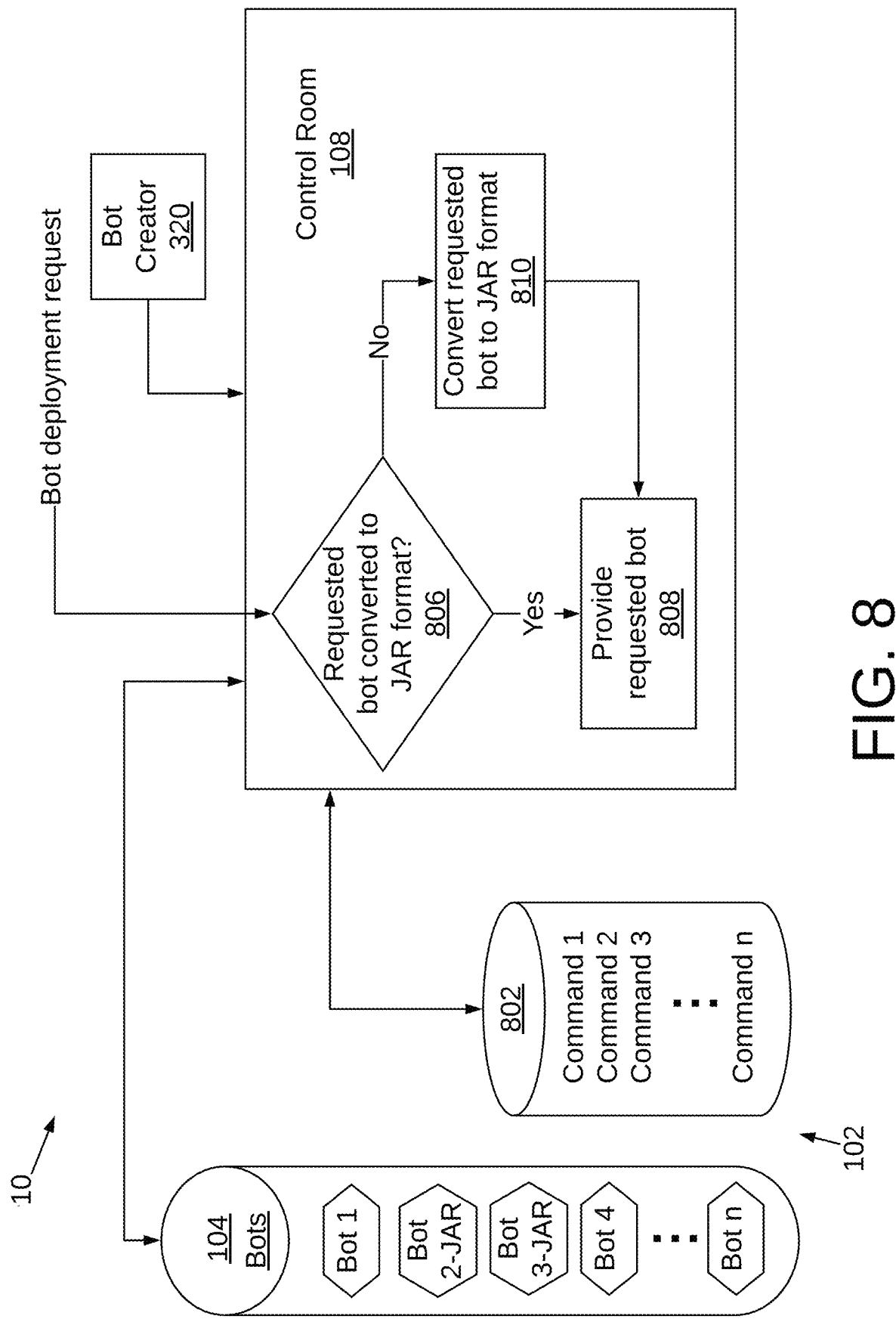
FIG. 8 illustrates an embodiment for providing bots in a platform independent manner.
Figure 9:
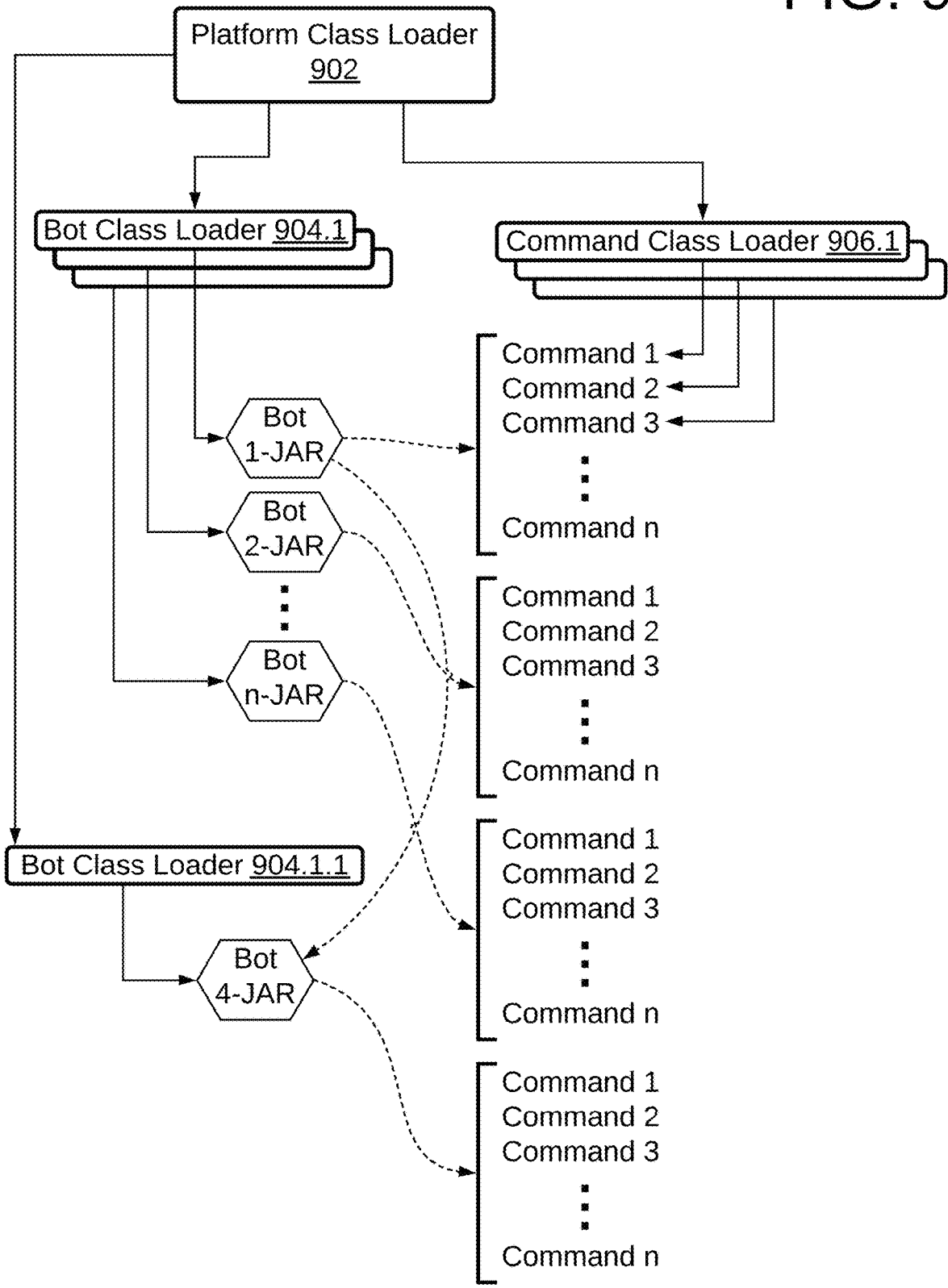
FIG. 9 illustrates details of class loading in an embodiment employing a java virtual machine.

FIGS. 8 and 9 illustrate embodiments of the system 10 in which bots 104 are converted to and executed in a portable, operating system independent format such as shown in the embodiments of FIGS. 6A and 6B. In the embodiments of FIGS. 8 and 9, the bots 104 are converted to a Java ARchive (JAR) format for execution in a Java Runtime Environment by way of a Java Virtual Machine (JVM). As will be understood by those skilled in the art, a JAR is a file format used for aggregating many files into one, which permits Java applications and their requisite components (.class files, images and sounds) can be downloaded in a single HTTP transaction, instead or requiring a new connection for each piece. This improves the speed with which an application can be loaded into the JVM and begin functioning. The JAR format also supports compression, which reduces the size of the file and further improves download time. Moreover, individual entries in a JAR file may be digitally signed by the application author to authenticate their origin.

Turning to FIG. 8, control room 108 automatically converts a preexisting bot 104 to a JAR format employing conventional techniques upon a bot deployment request, which may be triggered upon a user action or by a schedule provided by a user or administrator. In the embodiment of FIG. 8, each command 802 supported by the system 10 for use in a bot 104 is stored in JAR format. Upon receipt of a bot deployment request, the control room 108 retrieves the requested bot 104 from repository 102 and checks its format at 806. If the requested bot 104 is in a JAR format, then the requested bot 104 is provided at 808. If the requested bot 104 has not been converted to a JAR format or if the requested bot has changed, then the requested bot 104 is converted at 810 to a JAR format by processing the bot 104 to replace each command in the bot 104 with an equivalent command stored in a JAR format. The requested bot 104 is then provided at 808. As seen, at any given time, the repository 102 may contain some bots 104 that have been converted to a JAR format (Bot 2-jar, Bot 3-jar) and other bots that have not yet been converted to a JAR format (Bot 1, Bot 4). In the embodiment of FIG. 8, newly created bots, such as by way of bot creator 320 are created and stored in a JAR format by use of commands 802 that exist in a JAR format. The node manager 114 inspects the bot jar and provides information regarding the bot jar to the bot launcher 144 which launches the bot 104 in a user session 118 which provides isolation in the user session 118 for execution of the bot 104 which executes with the credentials of the user, which is as if a human user were logged into the system 10 under their credentials and accessing system resources under their credentials. The bot 104 has the permissions of the user 104 in performing its programmed tasks.

FIG. 9 illustrates details of class loading in an embodiment employing a java virtual machine. In the embodiment of FIG. 9, execution of bots and instructions within bots, which as described in connection with FIG. 8 are stored in a JAR format, are advantageously contained by separate java class loaders to increase security and isolation, thereby increasing predictability of execution of the bots. In the embodiment of FIG. 9, three types of class loaders are employed: platform class loader 902, bot class loader 904 and command class loader 906. The class loaders are arranged in a hierarchy with each bot class loader 904 and each command class loader 906 being a child of the platform class loader 902. Each bot 104 is assigned its own class loader and each command in each bot is assigned its own class loader. As will be appreciated by those skilled in the art, a Java ClassLoader is a part of the Java Runtime Environment that dynamically loads Java classes into the Java virtual machine. The bot launcher 144 advantageously creates a platform class loader 902 and creates an association between the platform class loader 902 and each bot class loader 904 and each command class loader 906. The platform class loader 902 advantageously spawns a separate bot class loader 904 for each bot 104 that is loaded and spawns a separate command class loader 906 for each command in each bot. As seen in FIG. 9, a bot class loader 904.1 is employed to load Bot 1-JAR and separate class loaders 904.x are employed for additional hots, Bot 2-JAR and so forth. In the embodiment of FIG. 9, the bot launcher 144 advantageously spawns a separate class loader 906 for each command in each bot. As in the embodiment of FIG. 8, each command 802 is stored in a JAR format. As seen in FIG. 9, a command class loader 906.1 is employed to load Command 1 and separate class loaders 906.x are employed for the additional commands in Bot 1-JAR. Similarly, the for the other bots (e.g. Bot 2-JAR, . . . ) separate command class loaders 906 are used for each command in each of the hots. Commands are loaded via their own class loader 906 and then injected into the bot class loader 904 that owns the commands. Additionally, as seen in FIG. 9, a bot class loader 904.1 for a bot (Bot 1-JAR) that incorporates another (child) bot (Bot 4-JAR) has associated therewith, a child class loader 904.1.1, which is spawned by the platform class loader 902.

The class loaders employ the following rules for delegation. The platform class loader 902 has a hardcoded list of what packages should be shared with the bot and command packages from either the bot launcher 144 or the bot-runtime. For the bot class loader 904, all the command and bot-related contracts are attempted to load from the bot JAR first but all the other classes are delegated to load from the parent first. As will be appreciated by those skilled in the art, a contract employed by a bot is an agreement that the class will expose certain methods, certain properties, and certain behaviors. All commands associated with this bot will be fed from a local map that gets populated with command classes that are loaded by its own class loader. All other classes except the bot-related classes will check the parent first. All JARs in the local class path of this loader will be checked. For the command class loader 906, all classes are delegated to load from the parent first. If a requested class is in a package that must be shared, the request will be passed on to the bot launcher 144 class loader, which may be a default class loader provided by Java to run the bot launcher class loader. Otherwise, it is passed directly to the bootstrap classloader which is provided by the JVM and is typically part of the core JVM and serves as the parent for all class loaders in the system. This means that no classes loaded by the bootstrap classloader, launcher or any transitive dependencies will be made available to the bot or command package unless explicitly added to a shared package list maintained by the platform class loader 902. Requests to load bot runtime classes are satisfied from a jar file that must be supplied when the class loader is instantiated. In one embodiment, the platform classloader 902 has a hardcoded list of what packages should be shared with the bot and command packages from either the engine or the bot-runtime. As will be appreciated by those skilled in the art, a bootstrap class loader is a portion of machine code that loads the system class loader upon startup of the JVM. The bootstrap classloader also takes care of loading all of the code needed to support the basic Java Runtime Environment (JRE), including classes in the java.util and the java.lang packages. Other than the bootstrap class loader, all classes in one embodiment are implemented as Java classes.

The hierarchical arrangement of class loaders shown in FIG. 9 provides a number of advantages. Centralization of certain common functions in the platform class loader 902 ensures that each bot class loader 904 and command class loader 906 inherit directly, without any intervening class loader, the common functions provided by the platform class loader. Thus, every action in the system 10 performed by a bot is tracked by way of the logging function provided by the platform class loader 902 and every action in the system 10 is performed in accordance with the security rules put in place by the platform class loader 902. Direct delegation of these properties by the platform class loader 902 to each command class loader 906 avoids inadvertent or deliberate intervention and override by a bot via the bot class loader 904. The delegation of these properties is enforced and cannot be overridden by a bot or by a command. Moreover, allocation of a separate class loader 906 for each command ensures that use of the same class name in two commands will result in loading of the desired class for each command. An individual developing a command 802 may include a dependency on a function that is employed by the bot executing the command 802 and an individual in another organization for example may develop a command 802 with a reference to another class by the same class name. A Java class loader when encountering a class name checks to see if that class name has been loaded and if it has not been loaded then loads the class corresponding to that class name. When it encounters another class with a name that has already been loaded, it will skip loading that class. Thus, if multiple commands are loaded by the same class loader, in a first command that references a class foo, the class foo will be loaded. A subsequent command that references a class foo, but with a slightly different implementation will not get its foo class loaded. When executing, the subsequent command will be provided with the foo class of the first command and may fail execution because the first foo command does not provide the expected behavior (i.e. functionality) of the foo command implemented by the subsequent command. The foregoing isolation permits use in the system 10 of bots and commands that are developed by numerous individuals/entities. Entity X can employ a bot developed by entity Y with commands developed by entities W, Y and Z. This increases the pace with which application automation can be achieved, while maintaining the security and application isolation in such automated environments as would occur with humans performing the tasks using credentials provided to them by their respective system administrators.

The common functions implemented by the platform class loader 902 include the bot and command contract, security functions, logging, Java Native Interface (JNI), Java Native Access (JNA), Java FX, metrics, and the message interface. A contract in a Java class is an agreement that the class will expose certain methods, certain properties, and certain behaviors. The Java Native Interface (JNI) is a foreign function interface programming framework that enables Java code running in a JVM to call and be called by native applications (those programs specific to a hardware and operating system platform) and libraries written in other languages such as C, C++ and assembly. Java Native Access (JNA) is a community-developed library that provides Java programs easy access to native shared libraries without using the JNI. JNA's design aims to provide native access in a natural way with a minimum of effort. No boilerplate or generated glue code is required. Java FX are libraries provided by Java to render U/I components. Metrics provide information on performance, such as how fast is a command being processed, how often is a command being used, etc. The message interface provides a language independent common messaging interface, independent of a particular language.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Figure 10:
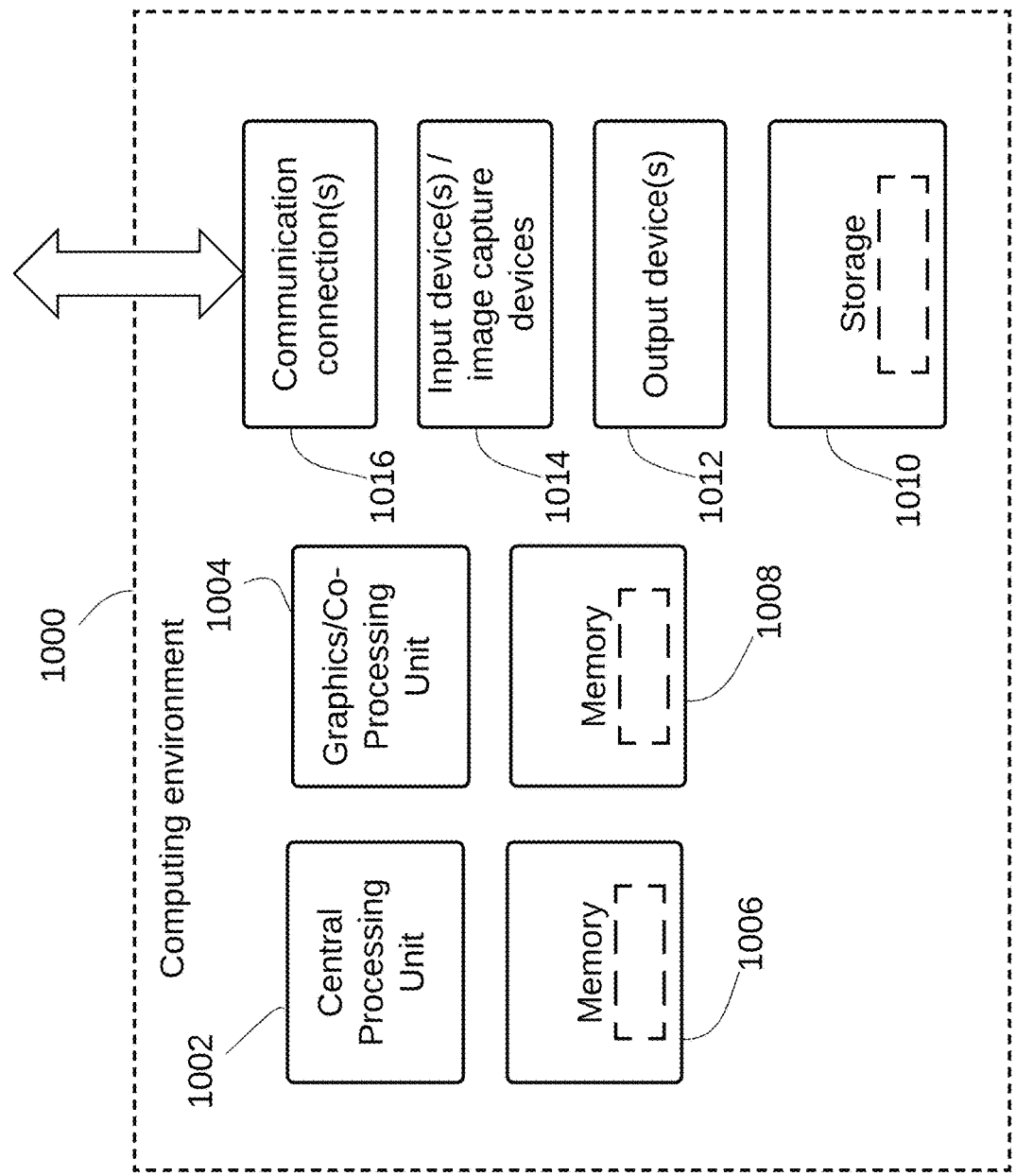
FIG. 10 illustrates a block diagram of hardware that may be employed in an implementation of the RPA systems disclosed herein.

FIG. 10 illustrates a block diagram of hardware that may be employed in an implementation of the RPA system as disclosed herein. FIG. 10 depicts a generalized example of a suitable general-purpose computing system 1000 in which the described innovations may be implemented in order to improve the processing speed and efficiency with which the computing system 1000 operates to perform the functions disclosed herein. With reference to FIG. 10 the computing system 1000 includes one or more processing units 1002, 1004 and memory 1006, 1008. The processing units 1002, 1006 execute computer-executable instructions. A processing unit can be a general-purpose central processing unit (CPU), processor in an application-specific integrated circuit (ASIC) or any other type of processor. The tangible memory 1006, 1008 may be volatile memory (e.g., registers, cache, RAM), non-volatile memory (e.g., ROM, EEPROM, flash memory, etc.), or some combination of the two, accessible by the processing unit(s). The hardware components in FIG. 10 may be standard hardware components, or alternatively, some embodiments may employ specialized hardware components to further increase the operating efficiency and speed with which the system 10 operates. The various components of computing system 1000 may be rearranged in various embodiments, and some embodiments may not require nor include all of the above components, while other embodiments may include additional components, such as specialized processors and additional memory.

Computing system 1000 may have additional features such as for example, storage 1010, one or more input devices 1014, one or more output devices 1012, and one or more communication connections 1016. An interconnection mechanism (not shown) such as a bus, controller, or network interconnects the components of the computing system 1000. Typically, operating system software (not shown) provides an operating system for other software executing in the computing system 1000, and coordinates activities of the components of the computing system 1000.

The tangible storage 1010 may be removable or non-removable, and includes magnetic disks, magnetic tapes or cassettes, CD-ROMs, DVDs, or any other medium which can be used to store information in a non-transitory way, and which can be accessed within the computing system 1000. The storage 1010 stores instructions for the software implementing one or more innovations described herein.

The input device(s) 1014 may be a touch input device such as a keyboard, mouse, pen, or trackball, a voice input device, a scanning device, or another device that provides input to the computing system 1000. For video encoding, the input device(s) 1014 may be a camera, video card, TV tuner card, or similar device that accepts video input in analog or digital form, or a CD-ROM or CD-RW that reads video samples into the computing system 1000. The output device(s) 1012 may be a display, printer, speaker, CD-writer, or another device that provides output from the computing system 1000.

The communication connection(s) 1016 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A robotic process automation system comprising:
    data storage for storing,
        a plurality of sets of task processing instructions, each set of task processing instructions operable to interact at a user level with one or more designated user level application programs; and
        a plurality of work items, each work item stored for subsequent processing by executing a corresponding set of task processing instructions;
    a server processor operatively coupled to the data storage and configured to execute instructions that when executed cause the server processor to respond to a request to perform an automation task to process a work item from the plurality of work items, by:
        initiating a java virtual machine on a second device;
        initiating on the second device, a first user session, employing credentials of a first user, for managing execution of the automation task;
        permitting retrieval of the set of task processing instructions that correspond to the work item;
        loading into the java virtual machine, with a platform class loader, a logging module and a security module wherein the logging module logs events that occur during operation of the platform class loader and wherein the security module provides security functions during operation of the platform class loader;
        loading with a first class loader a first set of task processing instructions;
        loading each instruction in the first set of task processing instructions with a separate class loader; and
        causing execution, under control of the first user session, on the second device, the task processing instructions that correspond to the work item.

2. The robotic process automation system of claim 1 wherein permitting retrieval of the set of task processing instructions that correspond to the work item comprises:
    checking formatting of the task processing instructions and converting formatting of the task processing instructions to a Java Archive format if the task processing instructions are in a format different from a Java Archive format.

3. The robotic process automation system of claim 2 further comprising:
    storing the task processing instructions in Java Archive format to the data storage to replace a version of the task processing instructions stored in a format other than a Java Archive format.

4. The robotic process automation system of claim 1 wherein the platform class loader employs delegation rules comprising:
    maintaining a hardcoded list of packages that can be shared with the set of task processing instructions and that can be shared with each instruction in the set of task processing instructions;
    loading first all commands and contracts first from the set of task processing instructions; and
    loading all classes other than the commands and contracts from the platform class loader.

5. The robotic process automation system of claim 4 wherein all commands associated with the set of task processing instructions are fed from a local map that is populated with command classes that are loaded by the platform class loader.

6. The robotic process automation system of claim 5 further comprising, passing a request for a requested class that is in a package that must be shared, to class loader that is a parent to the platform class loader.

7. The robotic process automation system of claim 1 wherein the second device is a virtual device implemented by a virtual machine executing in an operating system on a processor.

8. A robotic process automation system comprising:
    data storage for storing,
        a plurality of bots, each bot comprising a set of task processing instructions, each bot operable to interact at a user level with one or more designated user level application programs; and a plurality of work items, each work item stored for subsequent processing by executing at least a first corresponding bot;

a server processor operatively coupled to the data storage and configured to execute instructions that when executed cause the server processor to respond to a request to perform an automation task to process a work item from the plurality of work items, by:

initiating a virtual machine on a second device wherein the virtual machine permits execution of instructions in a manner that is independent of an operating system executing on the second device;

initiating on the second device, a first user session, employing credentials of a first user, for managing execution of the automation task;

permitting retrieval of a first bot that corresponds to the work item;

loading into the virtual machine, with a platform class loader, a logging module and a security module wherein the logging module logs events that occur during operation of the platform class loader and wherein the security module provides security functions during operation of the platform class loader;

loading with a first class loader the first bot;

loading each instruction in the first bot with a separate class loader; and causing execution, under control of the first user session, on the second device, the first bot.

9. The robotic process automation system of claim 8 wherein permitting retrieval of the first bot comprises:

checking formatting of the first bot and converting formatting of first bot to a Java Archive format if the first bot is in a format different from a Java Archive format.

10. The robotic process automation system of claim 9 further comprising:

storing the first bot in Java Archive format to the data storage to replace a version of the first bot stored in a format other than a Java Archive format.

11. The robotic process automation system of claim 8 wherein the platform class loader employs delegation rules comprising:

maintaining a hardcoded list of packages that can be shared with the first bot and that can be shared with each instruction in the first bot;

loading all commands and contracts first from the first bot; and loading all classes other than the commands and contracts from the platform class loader.

12. The robotic process automation system of claim 11 wherein all commands associated with the first bot are fed from a local map that is populated with command classes that are loaded by the platform class loader.

13. The robotic process automation system of claim 12 further comprising, passing a request for a requested class that is in a package that must be shared, to class loader that is a parent to the platform class loader.

14. The robotic process automation system of claim 8 wherein the second device is a virtual device implemented by a virtual machine executing in an operating system on a processor.

15. A non-transitory storage medium, having stored thereupon one or more program modules comprising computer-executable instructions for execution on a computer system, the computer-executable instructions causing the computer system to implement a robotic process automation system that employs data storage for storing a plurality of bots, each bot comprising a set of task processing instructions, each bot operable to interact at a user level with one or more designated user level application programs the data storage further storing a plurality of work items, each work item stored for subsequent processing by executing at least a first corresponding bot, wherein the robotic process automation system employs a server processor operatively coupled to the data storage and configured to execute instructions that when executed cause the server processor to respond to a request to perform an automation task to process a work item from the plurality of work items, by:

initiating a virtual machine on a second device wherein the virtual machine permits execution of instructions in a manner that is independent of an operating system executing on the second device;

initiating on the second device, a first user session, employing credentials of a first user, for managing execution of the automation task;

permitting retrieval of a first bot that corresponds to the work item;

loading into the virtual machine, with a platform class loader, a logging module and a security module wherein the logging module logs events that occur during operation of the platform class loader and wherein the security module provides security functions during operation of the platform class loader;

loading with a first class loader the first bot;

loading each instruction in the first bot with a separate class loader; and causing execution, under control of the first user session, on the second device, the first bot.

16. The non-transitory storage medium of claim 15 further comprising instructions that cause the robotic process automation system to perform permitting retrieval of the first bot by:

checking formatting of the first bot and converting formatting of first bot to a Java Archive format if the first bot is in a format different from a Java Archive format.

17. The non-transitory storage medium of claim 15 further comprising instructions that cause the robotic process automation system to perform permitting retrieval of the first bot by:

storing the first bot in Java Archive format to the data storage to replace a version of the first bot stored in a format other than a Java Archive format.

18. The non-transitory storage medium of claim 17 wherein the platform class loader employs delegation rules comprising:

maintaining a hardcoded list of packages that can be shared with the first bot and that can be shared with each instruction in the first bot;

loading all commands and contracts first from the first bot; and loading all classes other than the commands and contracts from the platform class loader.

19. The non-transitory storage medium of claim 18 wherein all commands associated with the first bot are fed from a local map that is populated with command classes that are loaded by the platform class loader.

20. The non-transitory storage medium of claim 15 wherein the second device is a virtual device implemented by a virtual machine executing in an operating system on a processor.

* * * * *